(12) United States Patent
Crabtree et al.

(10) Patent No.: US 11,468,368 B2
(45) Date of Patent: Oct. 11, 2022

(54) PARAMETRIC MODELING AND SIMULATION OF COMPLEX SYSTEMS USING LARGE DATASETS AND HETEROGENEOUS DATA STRUCTURES

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 2 days.

(21) Appl. No.: 17/106,479

(22) Filed: Nov. 30, 2020

(65) Prior Publication Data

US 2021/0209505 A1 Jul. 8, 2021

Related U.S. Application Data

(63) Continuation-in-part of application No. 16/575,929, filed on Sep. 19, 2019, now Pat. No. 11,074,652, which is a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned.

(51) Int. Cl.
*G06N 20/00* (2019.01)
*G06F 16/951* (2019.01)

(52) U.S. Cl.
CPC ........... *G06N 20/00* (2019.01); *G06F 16/951* (2019.01)

(58) Field of Classification Search
CPC .............................. G06F 16/951; G06N 20/00
USPC .......................................................... 726/25
See application file for complete search history.

(56) References Cited

U.S. PATENT DOCUMENTS

| | | |
|---|---|---|
| 6,256,544 B1 | 7/2001 | Weissinger |
| 20,050,165 | 7/2005 | Yeung et al. |
| 7,171,515 B2 | 1/2007 | Ohta et al. |
| 7,546,333 B2 | 6/2009 | Alon et al. |

(Continued)

FOREIGN PATENT DOCUMENTS

| | | |
|---|---|---|
| WO | 2014159150 A1 | 10/2014 |
| WO | 2015089463 A1 | 6/2015 |
| WO | 2017075543 A1 | 5/2017 |

OTHER PUBLICATIONS

Simonian et al., Robust value-at-risk: an information-theroetic approch
Huang, Alex, A comparison of value at risk approaches and a new method with extreme value theory and kernel estimator.

*Primary Examiner* — Bryan F Wright
(74) *Attorney, Agent, or Firm* — Galvin Patent Law LLC; Brian R. Galvin; Brian S. Boon

(57) ABSTRACT

A system for predicting future outcomes of dynamic and complex systems using simulation results driven by a parametric and blended analytic and modeling approach. A model engine and simulation engine in combination with a visualization engine using such an approach has been developed to produce geospatial and temporal context aware system models for use in generating predictive results which may be used to recommend future outcomes from continuously competing models derived from ingesting large amounts of varied but related data.

16 Claims, 14 Drawing Sheets

(56) References Cited

U.S. PATENT DOCUMENTS

| | | | |
|---|---|---|---|
| 7,774,440 B1* | 8/2010 | Bagrodia | H04L 41/145 |
| | | | 703/1 |
| 7,818,417 B2 | 10/2010 | Ginis et al. | |
| 7,840,677 B2 | 11/2010 | Li et al. | |
| 7,925,561 B2 | 4/2011 | Xu | |
| 8,069,190 B2 | 11/2011 | Mccoll et al. | |
| 8,132,260 B1 | 3/2012 | Mayer et al. | |
| 8,346,753 B2 | 1/2013 | Hayes | |
| 8,352,412 B2 | 1/2013 | Alba et al. | |
| 8,516,596 B2 | 8/2013 | Sandoval et al. | |
| 8,887,286 B2* | 11/2014 | Dupont | G06F 21/50 |
| | | | 726/25 |
| 9,152,727 B1 | 10/2015 | Balducci et al. | |
| 9,338,061 B2 | 5/2016 | Chen et al. | |
| 9,400,962 B2 | 7/2016 | Prasad | |
| 9,497,243 B1* | 11/2016 | Binns | H04L 65/80 |
| 9,560,065 B2* | 1/2017 | Neil | H04L 1/002 |
| 9,602,530 B2 | 3/2017 | Ellis et al. | |
| 9,613,104 B2 | 4/2017 | Smith et al. | |
| 9,639,575 B2 | 5/2017 | Leida et al. | |
| 9,652,538 B2 | 5/2017 | Shivaswamy et al. | |
| 9,672,283 B2 | 6/2017 | Pappas et al. | |
| 9,734,169 B2 | 8/2017 | Redlich et al. | |
| 9,870,294 B2* | 1/2018 | Seto | G06F 11/3065 |
| 10,061,635 B2 | 8/2018 | Ellwein | |
| 10,204,147 B2 | 2/2019 | Crabtree et al. | |
| 10,210,246 B2 | 2/2019 | Stojanovic et al. | |
| 10,210,255 B2 | 2/2019 | Crabtree et al. | |
| 10,216,485 B2 | 2/2019 | Misra | |
| 10,248,910 B2 | 4/2019 | Crabtree et al. | |
| 10,367,829 B2 | 7/2019 | Huang et al. | |
| 11,055,119 B1* | 7/2021 | Silverstein | G10L 15/26 |
| 2005/0165822 A1 | 7/2005 | Yeung et al. | |
| 2010/0223226 A1 | 9/2010 | Alba et al. | |
| 2011/0185432 A1 | 7/2011 | Sandoval et al. | |
| 2012/0215575 A1 | 8/2012 | Deb et al. | |
| 2012/0296845 A1 | 11/2012 | Andrews et al. | |
| 2013/0347116 A1 | 12/2013 | Flores et al. | |
| 2014/0079297 A1* | 3/2014 | Tadayon | G06V 40/172 |
| | | | 382/118 |
| 2014/0245443 A1* | 8/2014 | Chakraborty | H04L 63/1425 |
| | | | 726/23 |
| 2014/0250052 A1* | 9/2014 | Lospinoso | G06N 5/048 |
| | | | 706/59 |
| 2014/0324521 A1 | 10/2014 | Mun | |
| 2015/0254330 A1 | 9/2015 | Chan et al. | |
| 2016/0006629 A1 | 1/2016 | Akiev et al. | |
| 2016/0012235 A1 | 1/2016 | Lee et al. | |
| 2016/0119365 A1 | 4/2016 | Barel | |
| 2016/0275123 A1 | 9/2016 | Lin et al. | |
| 2018/0218453 A1 | 8/2018 | Crabtree et al. | |
| 2020/0004904 A1* | 1/2020 | Crabtree | G06F 30/20 |
| 2021/0168161 A1* | 6/2021 | Dunn | H04L 63/1425 |

* cited by examiner

PARAMETRIC MODELING AND SIMULATION OF COMPLEX SYSTEMS USING LARGE DATASETS AND HETEROGENEOUS DATA STRUCTURES

CROSS-REFERENCE TO RELATED APPLICATIONS

| application No. | Date Filed | Title |
|---|---|---|
| Current application | Herewith | PARAMETRIC MODELING AND SIMULATION OF COMPLEX SYSTEMS USING LARGE DATASETS AND HETEROGENEOUS DATA STRUCTURES Is a continuation-in-part of: |
| 16/575,929 | Sep. 19, 2019 | SYSTEM AND METHOD FOR CROWD-SOURCED REFINEMENT OF NATURAL PHENOMENON FOR RISK MANAGEMENT AND CONTRACT VALIDATION which is a continuation-in-part of: |
| 16/191,054 U.S. Pat. No. 10,681,074 | Nov. 14, 2018 Issue Date Jun. 9, 2020 | SYSTEM AND METHOD FOR COMPREHENSIVE DATA LOSS PREVENTION AND COMPLIANCE MANAGEMENT which is a continuation-in-part of: |
| 15/655,113 U.S. Pat. No. 10,735,456 | Jul. 20, 2017 Issue Date Aug. 4, 2020 | ADVANCED CYBERSECURITY THREAT MITIGATION USING BEHAVIORAL AND DEEP ANALYTICS which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | PARAMETRIC MODELING AND SIMULATION OF COMPLEX SYSTEMS USING LARGE DATASETS AND HETEROGENEOUS DATA STRUCTURES Is a continuation-in-part of: |
| 16/575,929 | Sep. 19, 2019 | SYSTEM AND METHOD FOR CROWD-SOURCED REFINEMENT OF NATURAL PHENOMENON FOR RISK MANAGEMENT AND CONTRACT VALIDATION which is a continuation-in-part of: |
| 16/191,054 U.S. Pat. No. 10,681,074 | Nov. 14, 2018 Issue Date Jun. 9, 2020 | SYSTEM AND METHOD FOR COMPREHENSIVE DATA LOSS PREVENTION AND COMPLIANCE MANAGEMENT which is a continuation-in-part of: |
| 15/655,113 U.S. Pat. No. 10,735,456 | Jul. 20, 2017 Issue Date Aug. 4, 2020 | ADVANCED CYBERSECURITY THREAT MITIGATION USING BEHAVIORAL AND DEEP ANALYTICS which is a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY which is a continuation-in-part of: |

-continued

| application No. | Date Filed | Title |
|---|---|---|
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION which is a continuation-in-part of: |
| 15/091,563 U.S. Pat. No. 10,204,147 | Apr. 5, 2016 Issue Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES and is also a continuation-in-part of: |
| 14/986,536 U.S. Pat. No. 10,210,255 | Dec. 31, 2015 Issue Date Feb. 19, 2019 | DISTRIBUTED SYSTEM FOR LARGE VOLUME DEEP WEB DATA EXTRACTION and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH | the entire specification of each of which is incorporated herein by reference.

BACKGROUND OF THE INVENTION

Field of the Invention

The present invention is in the field of computer simulations and data management and integration. Specifically, transforming large and complex data sets for use in system modeling and simulations.

Discussion of the State of the Art

Modeling large, complex systems requires careful selection of computational tools and algorithmic approaches to the simulation engines. The current industry desire to possess a continuously extensible modeling framework is stifled due to the near endless number of additional constraints needed, as is the need for an online control methodology to assist or automate decisions for actors via simulation and emulation. It is also important to note that a simulation and emulation platform must not only include the traditional components for a cyber-physical model-defined as a modeling environment for system definition and experiment configuration and a run-time environment for the execution of the experiment—it must also be scalable, fault-tolerant, and capable of running in either an online or batch mode. As large-scale systems continue to become more complicated, the simulation and modeling capabilities used in the initial design and fielding processes will progressively become a component of ongoing operations and control strategies, which is not currently available in industry or elsewhere.

Furthermore, explicit treatment of system and component level uncertainty and vulnerability is required for state assessment in physical, networked, and socio-technical systems to determine viable transition states and action states. Measurement inaccuracies in many natural and human sciences can be quite substantial, making requisite a means of not only dealing with the traditional challenges associated with accuracy and precision but also of dealing with the variability and volatility of those same metrics across the various components and connections.

What is needed is a system and method to model and simulate dynamic real-world systems by using complex data structures and heterogeneous data sources whereby the simulation results provide accurate predictions and outcomes.

SUMMARY OF THE INVENTION

Accordingly, the inventor has developed a system for predicting future outcomes of dynamic and complex systems using simulation results driven by a parametric and blended analytic and modeling approach. A model engine and simulation engine in combination with a visualization engine using such an approach has been developed to produce geospatial and temporal context aware system models for use in generating predictive results which may be used to recommend future outcomes from continuously competing models derived from ingesting large amounts of varied but related data.

According to a preferred embodiment of the invention, a system for predicting future outcomes of dynamic and complex systems is disclosed, comprising: a model engine comprising at least a plurality of programming instructions stored in the memory of, and operating on at least one processor of, a computing device, wherein the plurality of programming instructions, when operating on the processor, cause the computing device to: receive a request for a set of predictive outcomes, wherein the set of predictive outcomes is based on a plurality of past events; retrieve a plurality of data regarding the plurality of events, wherein the plurality of data comprises past observations and past outcomes related to the plurality of events; analyze the plurality of data using one or more analytical methods; and generate a plurality of system models based at least in part on the analysis, wherein each system model differs by at least one parameter; a simulation engine comprising at least a plurality of programming instructions stored in the memory of, and operating on at least one processor of, a computing device, wherein the plurality of programming instructions, when operating on the processor, cause the computing device to: retrieve the plurality of system models from the model engine; perform a parametric simulation exercise with the plurality of system models, wherein at least one iteration for each of the system models is simulated; and determine a plurality of decision pathways from the parametric simulation exercise, wherein each decision pathway comprises a unique choice that leads to a future outcome with associated costs and risks; and a visualization engine comprising at least a plurality of programming instructions stored in the memory of, and operating on at least one processor of, a computing device, wherein the plurality of programming instructions, when operating on the processor, cause the computing device to: retrieve the plurality of decision pathways from the simulation engine; and render and display the plurality of decision pathways.

According to another preferred embodiment of the invention, a method for predicting future outcomes of dynamic and complex systems is disclosed, comprising the steps of: receiving a request for a set of predictive outcomes, wherein the set of predictive outcomes is based on a plurality of past events; retrieving a plurality of data regarding the plurality of events, wherein the plurality of data comprises past observations and past outcomes related to the plurality of events; analyzing the plurality of data using one or more analytical methods; and generating a plurality of system models based at least in part on the analysis, wherein each system model differs by at least one parameter; performing a parametric simulation exercise with the plurality of system models, wherein at least one iteration for each of the system models is simulated; and determining a plurality of decision pathways from the parametric simulation exercise, wherein each decision pathway comprises a unique choice that leads to a future outcome with associated costs and risks; and rendering and display the plurality of decision pathways.

According to various aspects of the invention, the predictive outcome is based on a plurality of actual events from the past or actual events happening in real time, or from a plurality of hypothesized events; the plurality of data comprises sensor data; the system further comprising a web-scraper, wherein the web-scraper retrieves Internet-data related to the plurality of events and wherein the related Internet-data is past observations and past outcomes; the analytical models include regression testing, neural networks, Bayesian learning, and support vector machines; the visualization engine renders the plurality of decision pathways as a computational graph; the visualization engine renders the plurality of decision pathways as one or more graphs; the plurality of decision pathways are discrete points or continuous vectors in simulation time.

BRIEF DESCRIPTION OF THE DRAWING FIGURES

The accompanying drawings illustrate several embodiments of the invention and, together with the description, serve to explain the principles of the invention according to the embodiments.

One skilled in the art will recognize that the particular embodiments illustrated in the drawings are merely exemplary, and are not intended to limit the scope of the present invention.

Figure 5:
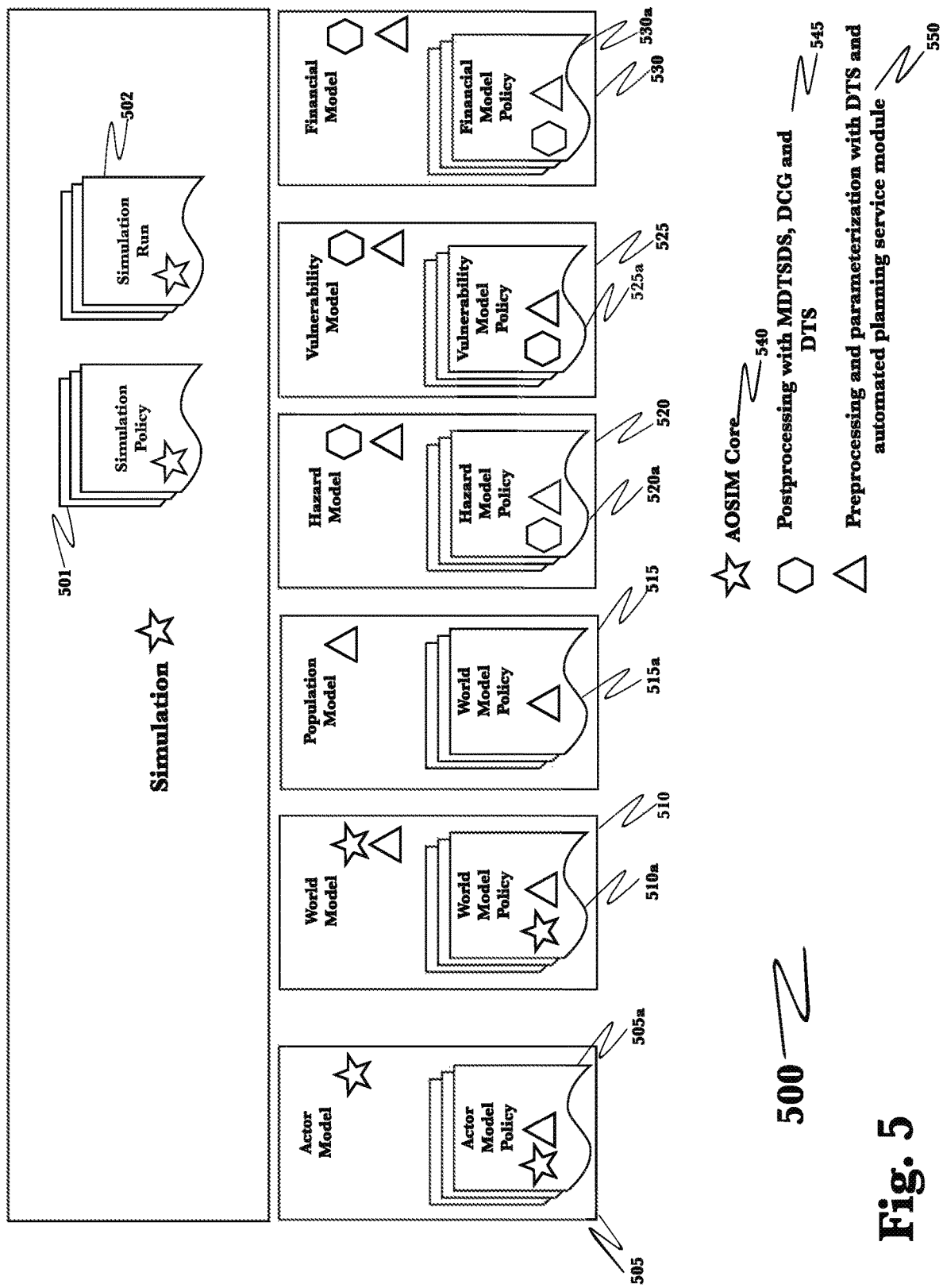

FIG. 5. is a diagram depicting the primary processing locations of individual components of an action outcome simulation module simulation.

Figure 6:
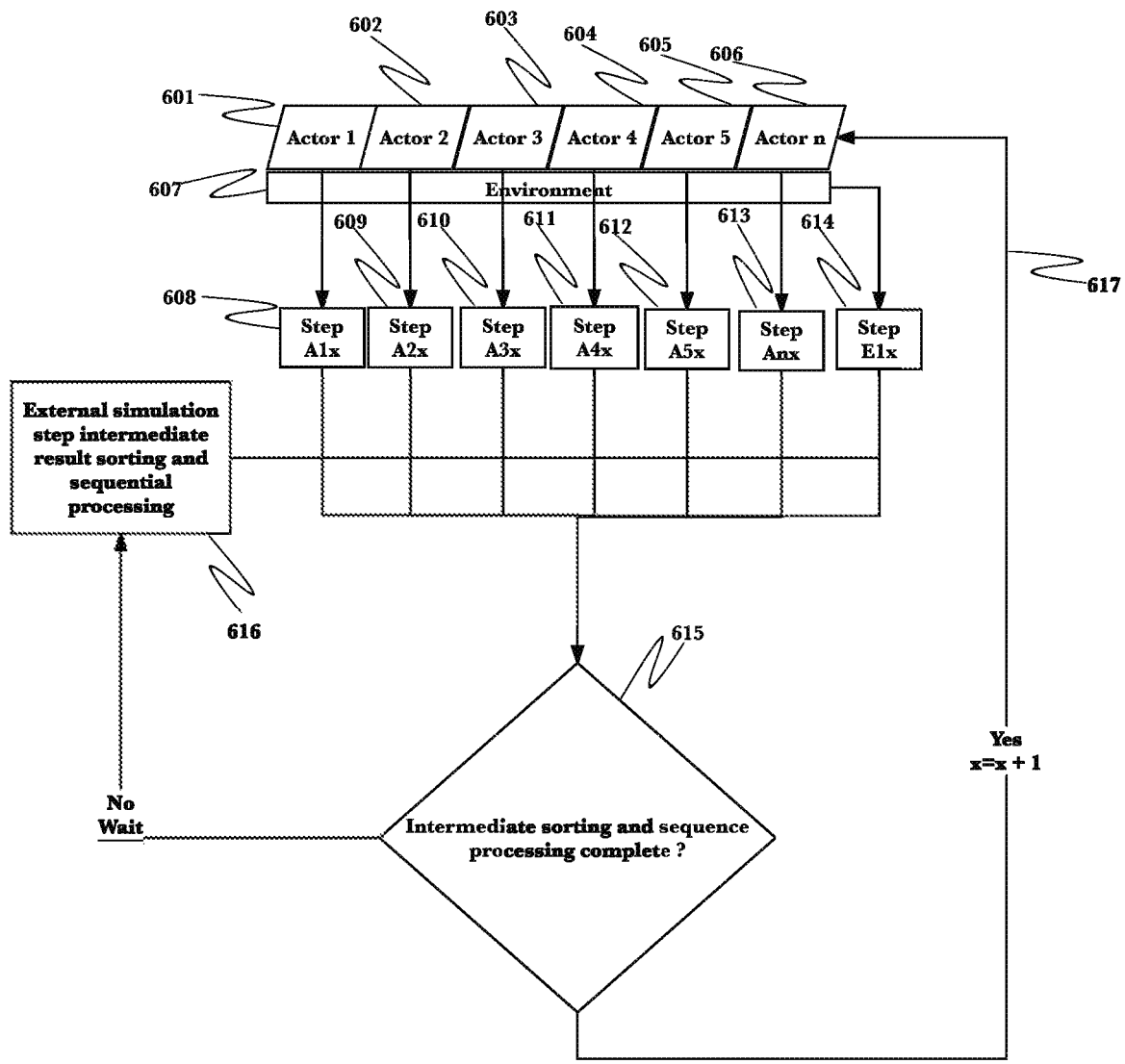

FIG. 6 is a flow chart diagram illustrating centralized event queue timing according to an embodiment of the invention.

Figure 7:
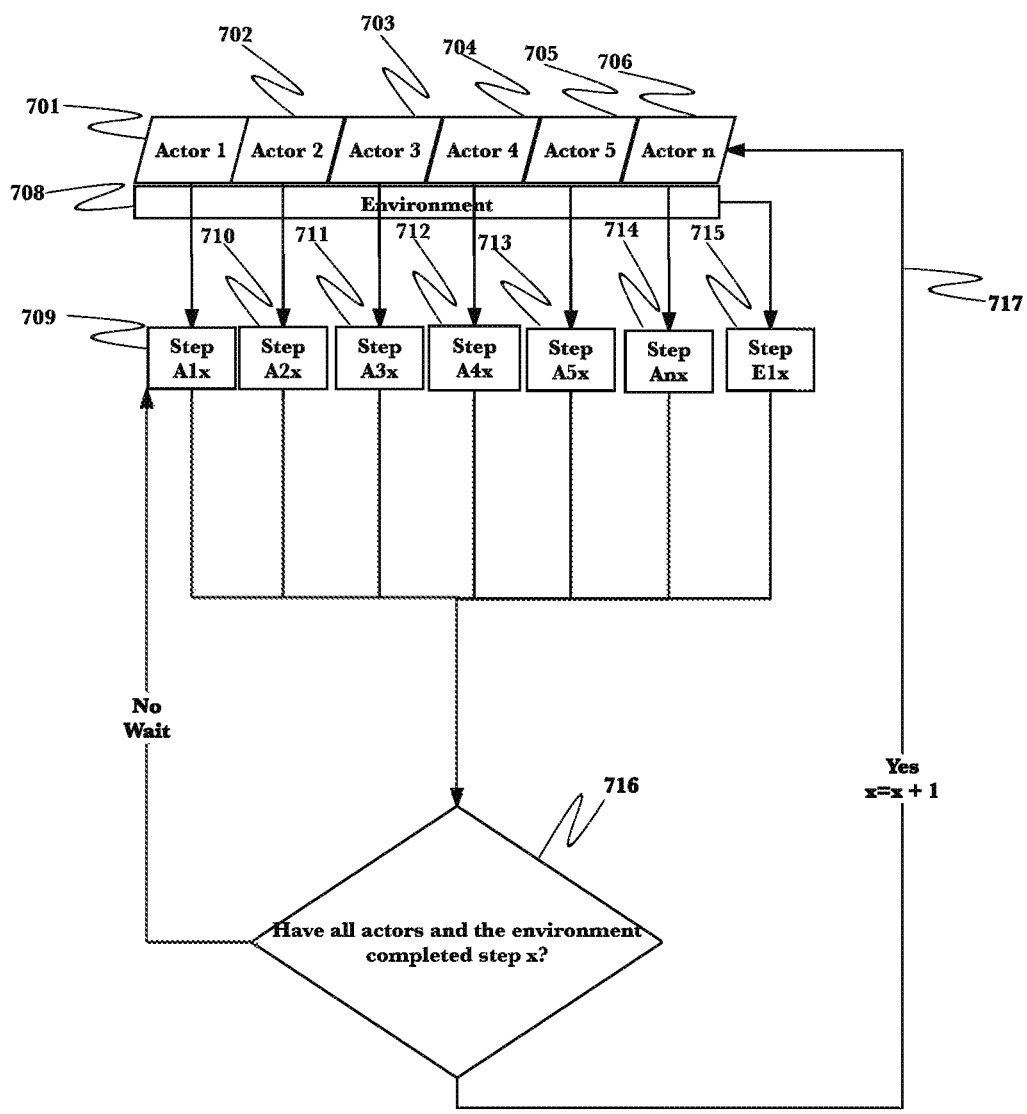

FIG. 7 is a flow chart diagram illustrating time stepped queue timing according to an embodiment of the invention.

Figure 8:
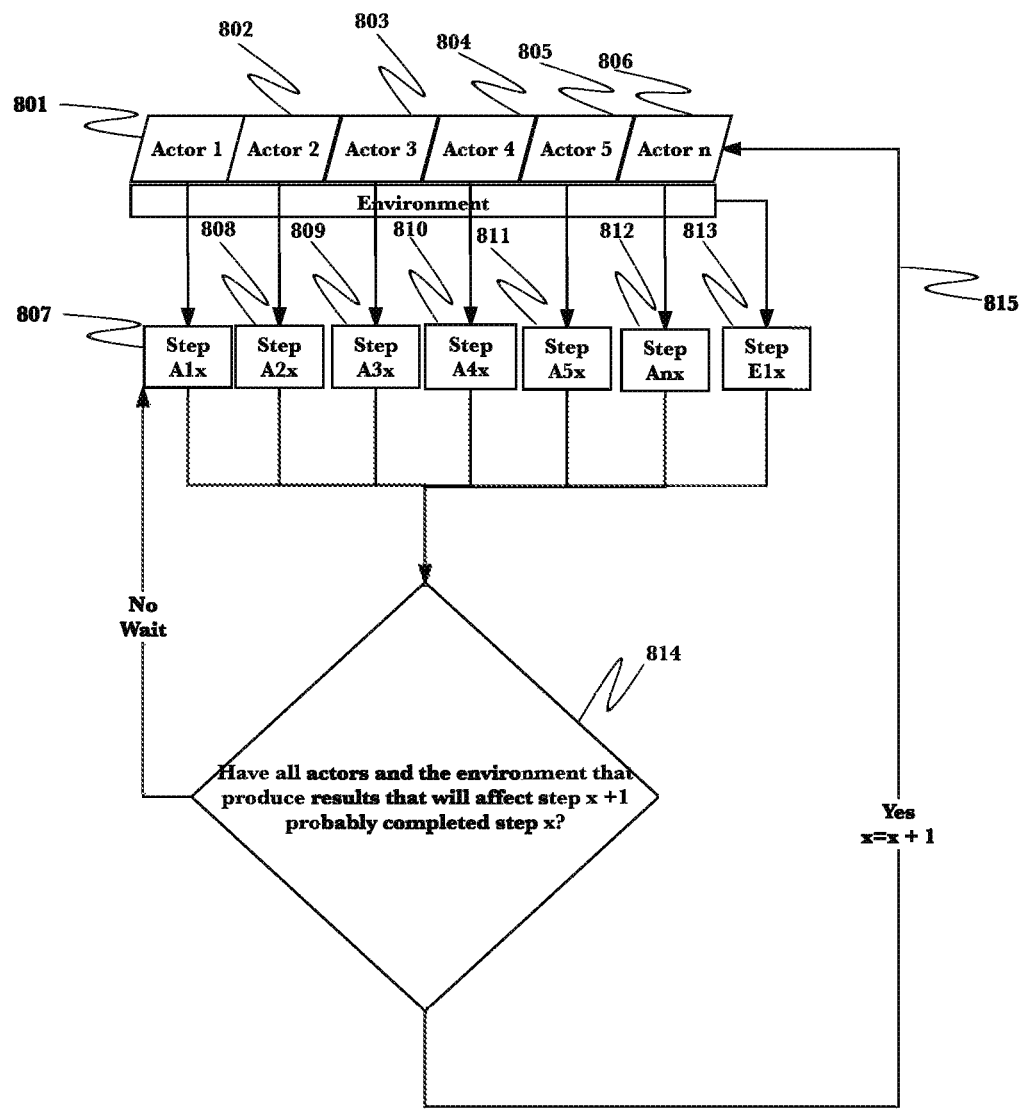

FIG. 8 is a flow chart diagram illustrating conservative event-driven queue timing according to an embodiment of the invention.

Figure 9:
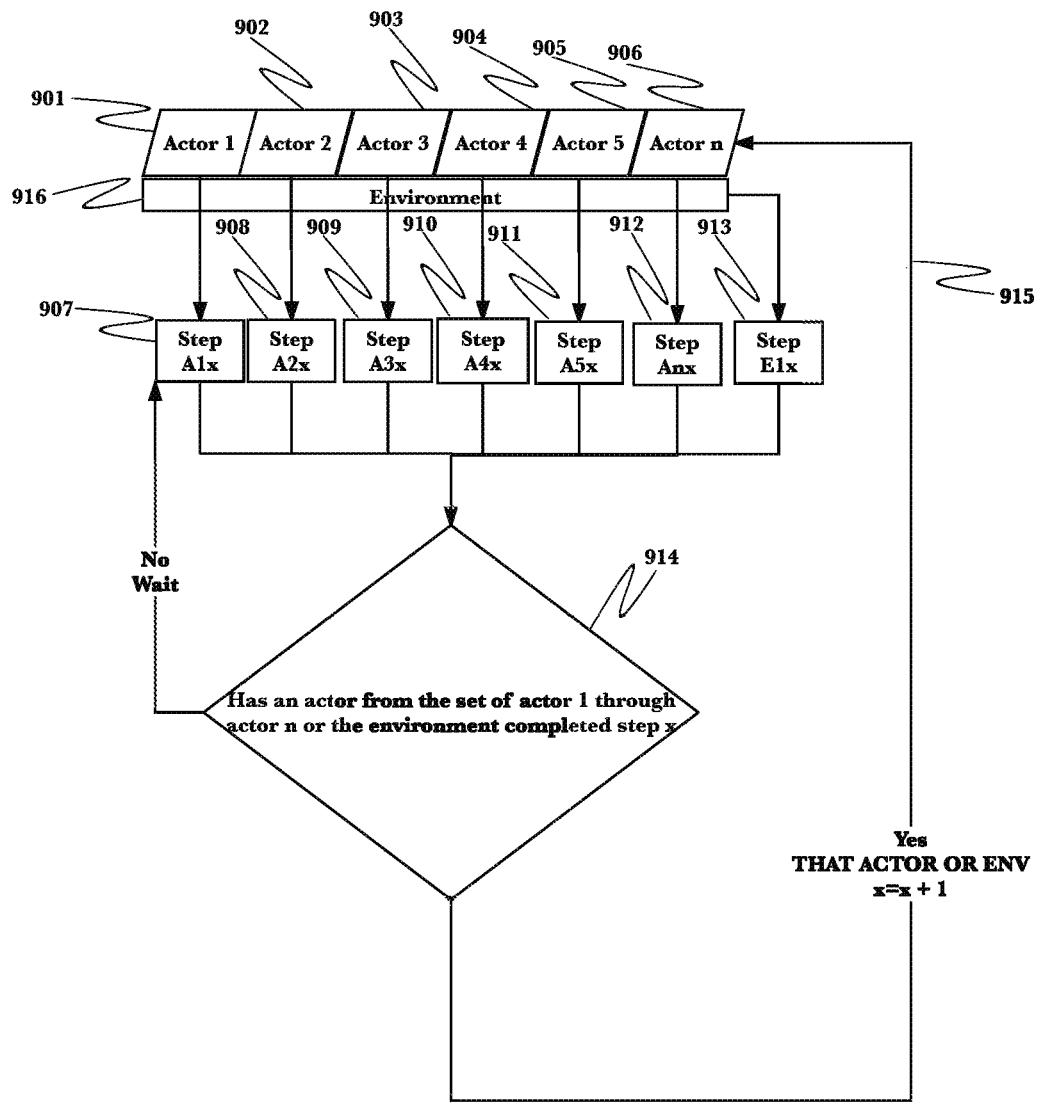

FIG. 9 is a flow chart diagram illustrating optimistic event-driven queue timing according to an embodiment of the invention.

Figure 10:
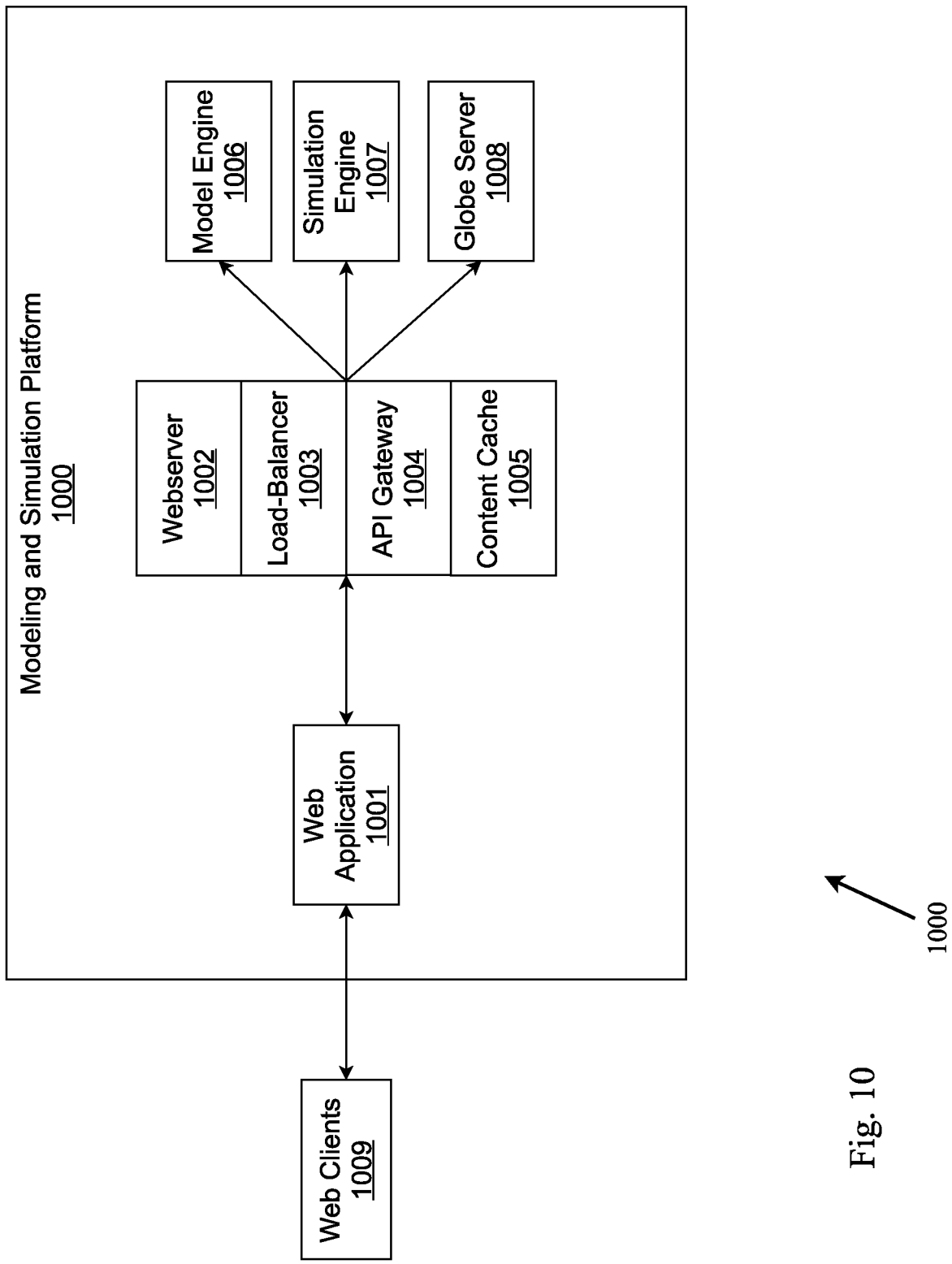

FIG. 10 is a block diagram of an exemplary system architecture of a modeling and simulation platform according to an embodiment of the invention.

Figure 11:
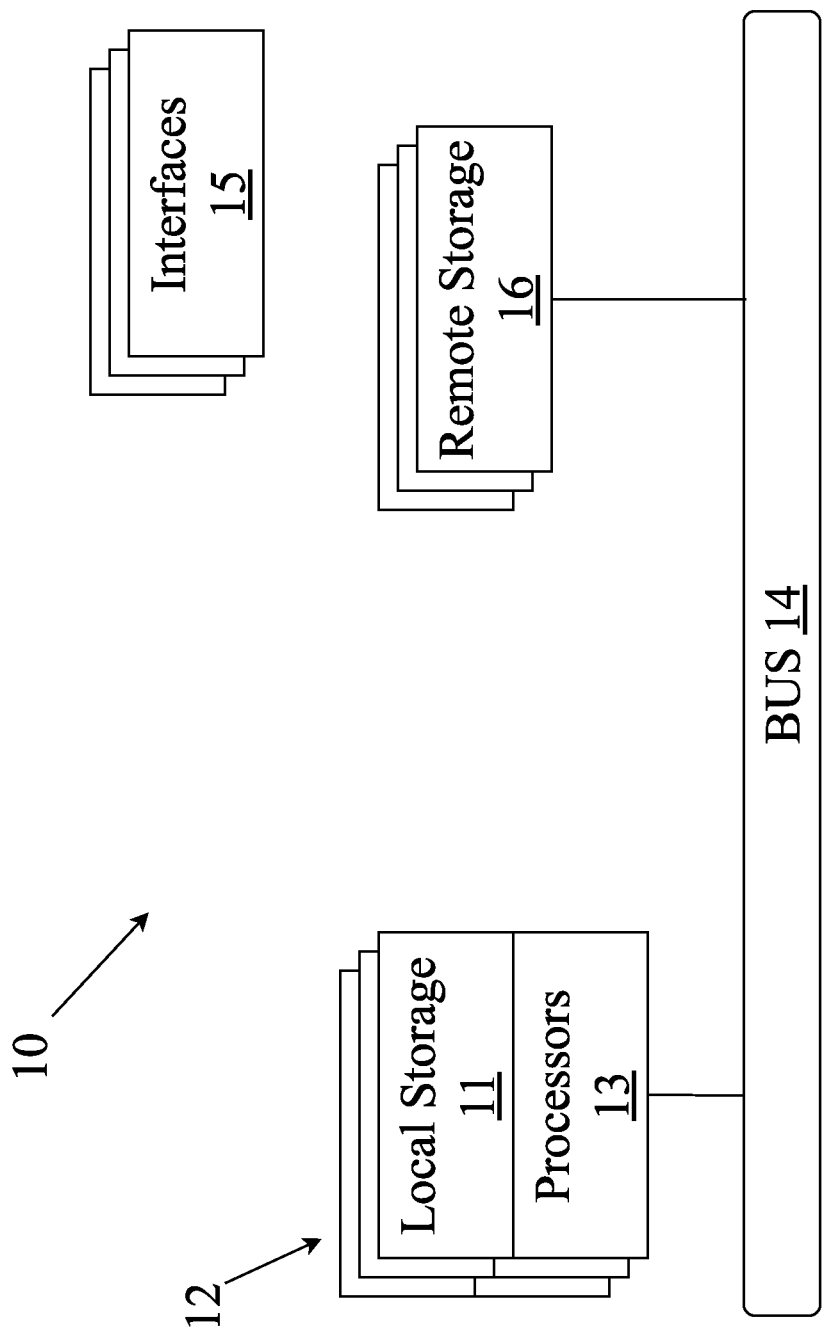

FIG. 11 is a block diagram illustrating an exemplary hardware architecture of a computing device used in various embodiments of the invention.

Figure 12:
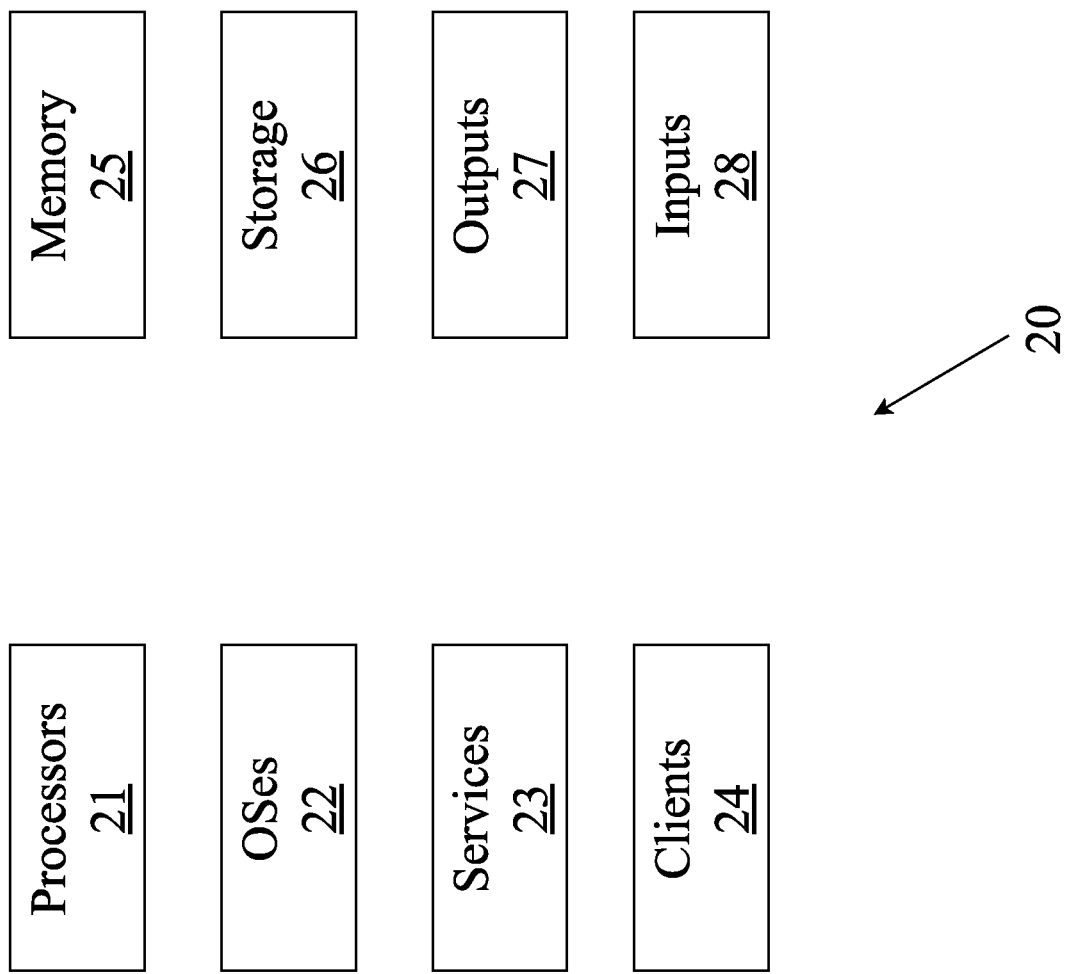

FIG. 12 is a block diagram illustrating an exemplary logical architecture for a client device, according to various embodiments of the invention.

Figure 13:
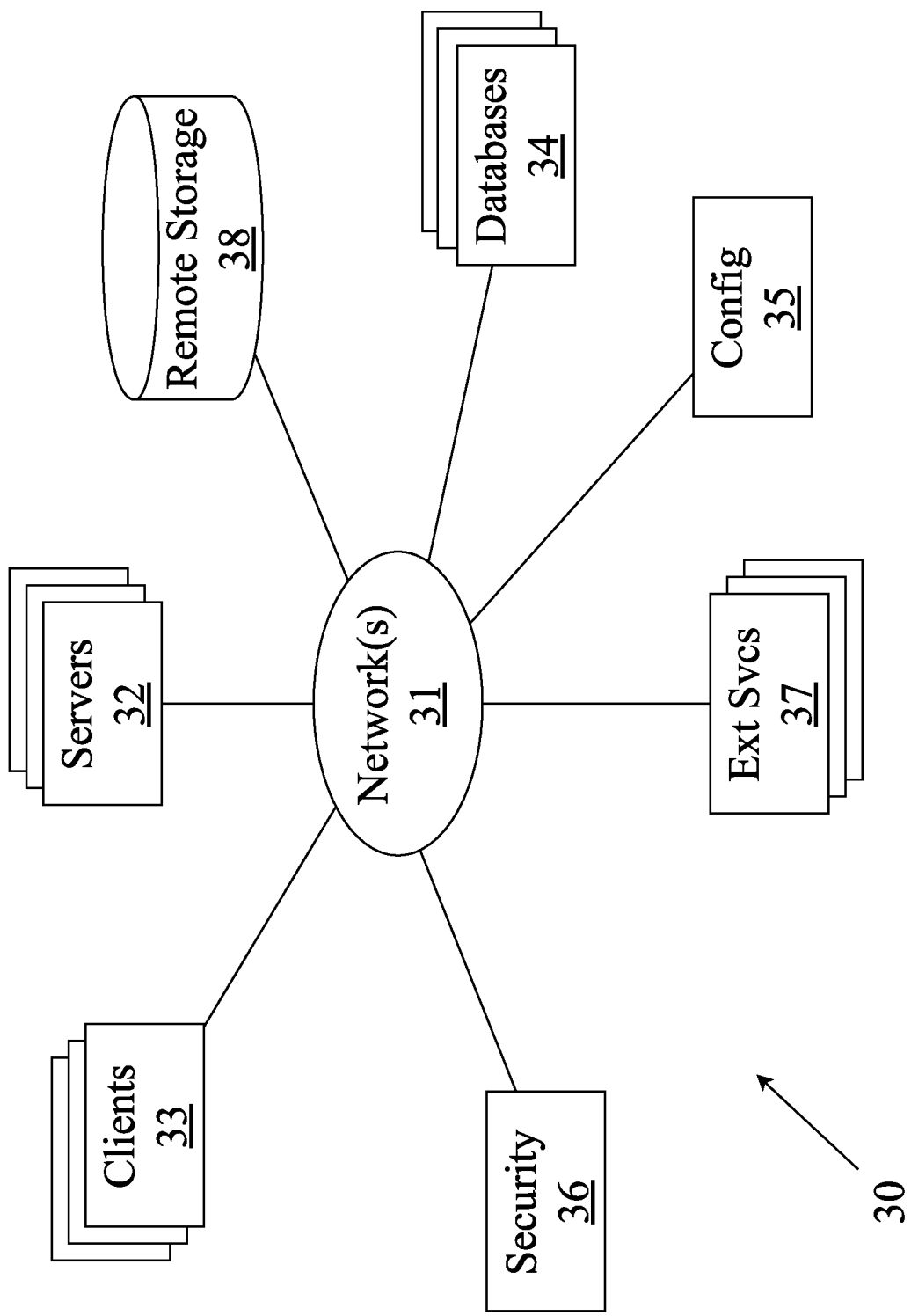

FIG. 13 is a block diagram illustrating an exemplary architectural arrangement of clients, servers, and external services, according to various embodiments of the invention.

Figure 14:
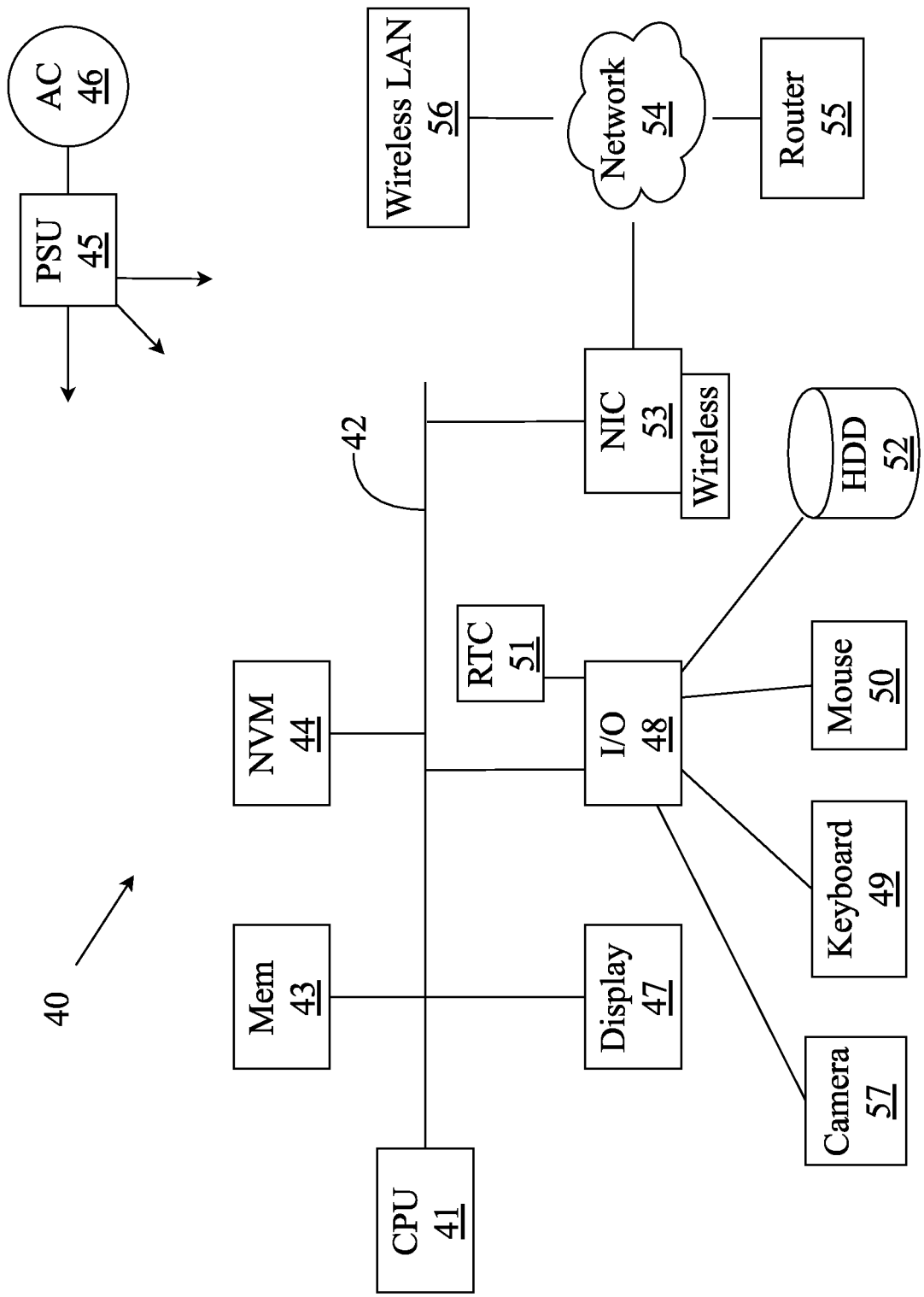

FIG. 14 is another block diagram illustrating an exemplary hardware architecture of a computing device used in various embodiments of the invention.

DETAILED DESCRIPTION

The inventor has conceived, and reduced to practice, a system for predicting future outcomes of dynamic and complex systems using simulation results driven by a parametric and blended analytic and modeling approach. A model engine and simulation engine in combination with a visualization engine using such an approach has been developed to produce geospatial and temporal context aware system models for use in generating predictive results which may be used to recommend future outcomes from continuously competing models derived from ingesting large amounts of varied but related data.

A central challenge of modeling, and ultimately prediction, of complex target systems is the definition of boundaries. Closed systems with known physical laws are easily defined and bounded, but as our physical infrastructure becomes intertwined with information networks they are transformed from complicated to complex. Stated differently, this means that the target systems intended for evaluation by the claimed embodiments herein are those who can present numerous responses to a perturbation to the system. Because such a system, by definition, is highly adaptive and susceptible to change, approaches to modeling and prediction require a continual focus on updating assumptions, validating data, and doing so at a rate that will eclipse purely human faculties. Said differently, complex systems modeling requires a technical, pedagogical, and philosophical approach that is based on continual research and transformation. Such a system and approach are detailed herein by the inventor whereby the system and method provide accurate predictions via ingestion and transformation of complex data into simulation engines. A system and method to improve the process and timeline for experimental design to aid in answering questions about real-world systems probable performance or behavior in the future. A system that understands the appropriate combinations of components which should be included in a model, develops an understanding of performance expectations by allowing for system evolution over the time period of interest, understands the most substantial sources of uncertainty in existing models as they pertain to the question of interest, and specifies the nature of the additional data sources which would be most beneficial in reducing overall uncertainty of the model outcome: a probabilistic prediction.

The system and method may comprise a blended modeling approach by integrating both analytical methods and simulation modeling. Past observations from regression testing, neural networks, Bayesian learning, and support vector machines allow the system to glean retrospective outcomes which abide by the rule that the outcome is valid only if past conditions match future conditions. Furthermore, the said past observations may be used to extract system models (system dynamics, discrete-events, agent-based information, etc.) for simulation modeling. This simulation modeling iteratively learns about casual relationships thus leading to the desired results of recommending continuously competing combinations of approaches or informing users to assist in decision making.

According to one embodiment, a distributed system for accurate and detailed modeling of systems with large and complex datasets using a distributed simulation engine employing artificial intelligence/machine learning algorithms is disclosed. The system further uses results of information analytics to optimize the making of decisions and allow for alternate action pathways to be simulated using the latest data and machine-mediated prediction algorithms. Specifically, portions of the system are applied to the areas reliably predicting the outcomes of differential decision paths and prediction of risk to value for each set of decision choices through simulation of the progression of each decision pathway using the most current sensor data, specific programmed decision defining parameters and environment data available and then presenting that data in a format most useful to the authors of the simulation.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

Figure 1:
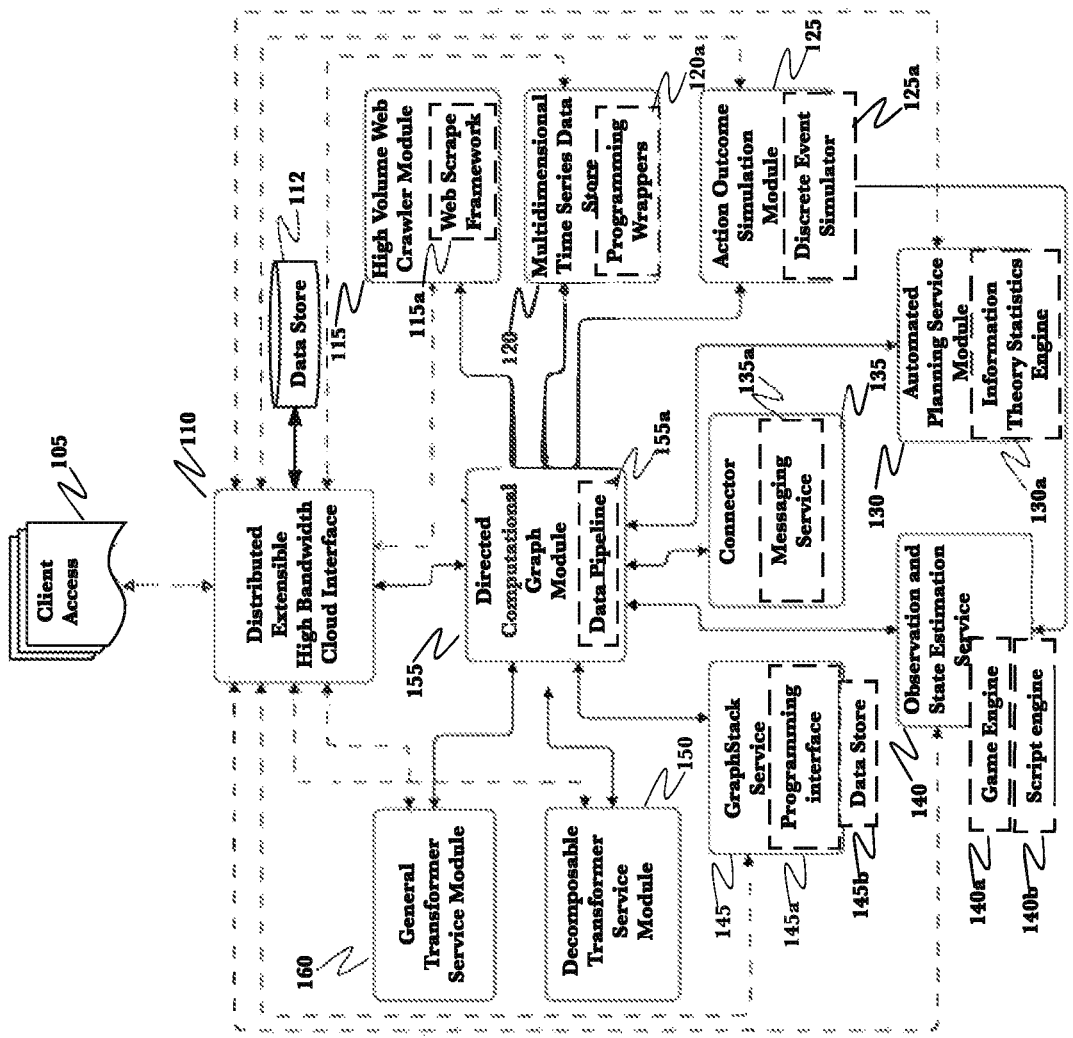
FIG. 1 is a diagram of an exemplary architecture of a decision operating system according to an embodiment of the invention.

FIG. 1 is a diagram of an exemplary architecture of a decision operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the decision data analyzed by the system both from sources within the confines of the client's databases, and from cloud based sources, also enter the system through the cloud interface 110, data being passed to the analysis and transformation components of the system, the directed computational graph module 155, high volume web crawler module 115, multidimensional time series database 120 and the graph stack service. The directed computational graph module 155 retrieves one or more streams of data from a plurality of sources, which includes, but is in no way not limited to, a plurality of physical sensors, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series database module 120 receives data from a large plurality of sensors that may be of several different types. The module is designed to accommodate irregular and high-volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional decision rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each of a plurality of possible decisions. The using all available data, the automated planning service module 130 may propose decisions most likely to result is the most favorable outcome with a usably high level of certainty. Closely related to the automated planning service module in the use of system derived results in conjunction with possible externally supplied additional information in the assistance of end user decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of decisions under consideration, allows decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the decision operating system 100 has data from them, which no one really studied due to the great volume of columnar figures, so the alternative courses 125, 140 of action are run. The system, based on all available data, predicts that the fouled sensor or pump is unlikely to be the root cause this time due to other available data, and the contractor is dispatched. She finds a small breach in the pipeline. There will be a small cleanup and the pipeline needs to be shut down for repair, but multiple tens of millions of dollars have been saved. This is just one example of a great many of the possible use of the decision operating system, those knowledgeable in the art will easily formulate more.

Figure 2:
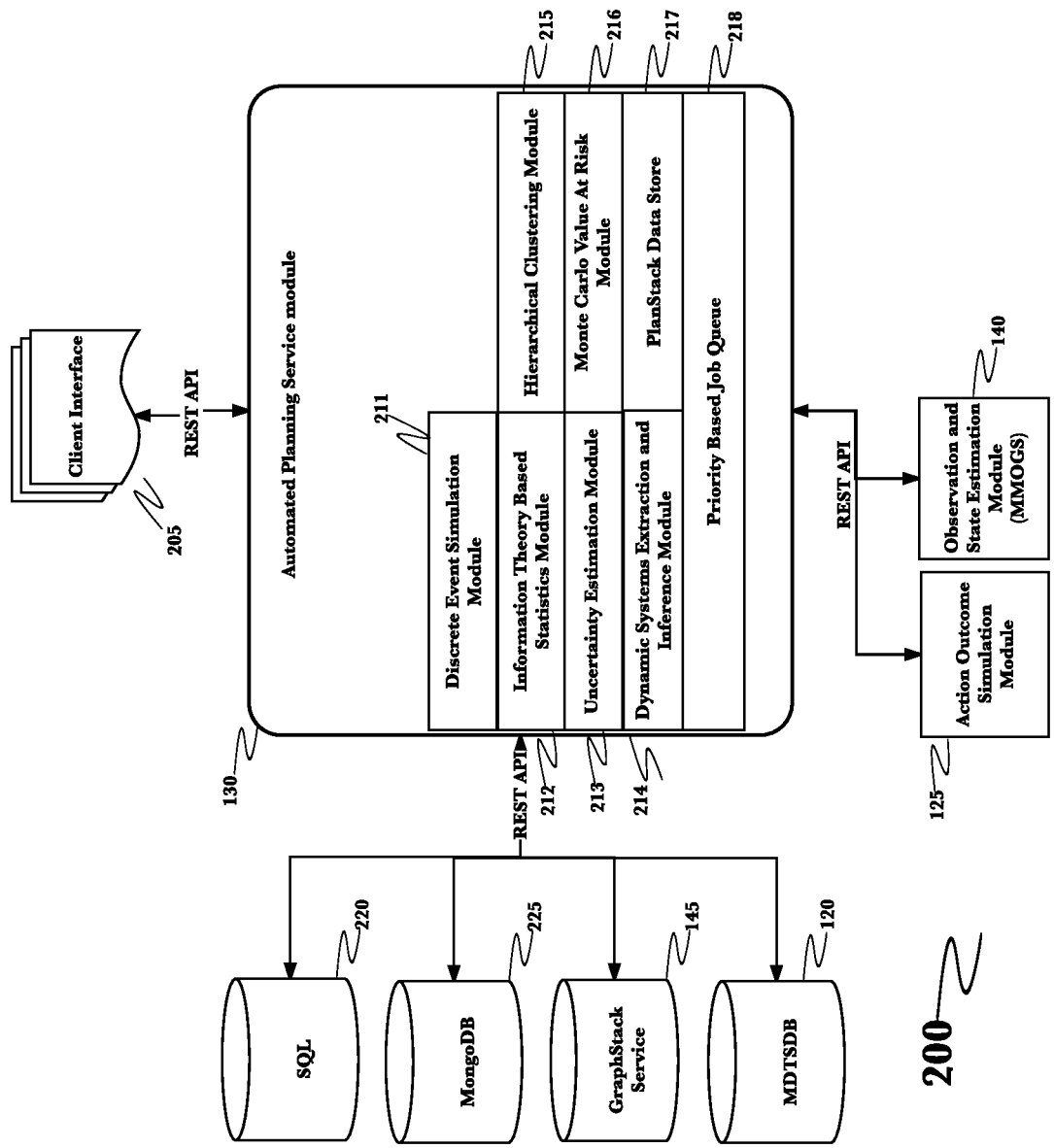
FIG. 2 is a diagram of an exemplary architecture of an automated planning service cluster and related modules according to an embodiment of the invention.

FIG. 2 is a diagram of an exemplary architecture of an automated planning service module and related modules according to an embodiment of the invention. Seen here is a more detailed view of the automated planning service module 130 as depicted in FIG. 1. The module functions by receiving decision candidates as well as relevant currently available related data and any analysis modification commands through a client interface 205. The module may also be used provide transformed data or run parameters to the action outcome simulation module 125 to seed a simulation prior to run or to transform intermediate result data isolated from one or more actors operating in the action outcome simulation module 125, 320, 320b, 320d, 320f during a simulation run. Significant amounts of supporting information such as, but not restricted to current conditions, infrastructure, ongoing status, and world events which may impact the current decision that have been collected by the decision operating system as a whole and stored in such data stores as the multidimensional times series database 120, the analysis capabilities of the directed computational graph module 155 and web-based data retrieval abilities of the high volume web crawler module 115 all of which may be stored in one or more data stores 220, 225 may also be used during simulation of alternative decision progression, which may entail such variables as, but are not limited to implementation timing, method to end changes, order and timing of constituent part completion or impact of choosing another goal instead of an action currently under analysis.

Contemplated actions may be broken up into a plurality of constituent events that either act towards the fulfillment of the venture under analysis or represent the absence of each event by the discrete event simulation module 211 which then makes each of those events available for information theory based statistical analysis 212, which allows the current decision events to be analyzed in light of similar events under conditions of varying dis-similarity using machine learned criteria obtained from that previous data; results of this analysis in addition to other factors may be analyzed by an uncertainty estimation module 213 to further tune the level of confidence to be included with the finished analysis. Confidence level would be a weighted calculation of the random variable distribution given to each event analyzed. Prediction of the effects of at least a portion of the events involved with a undertaking under analysis within a system as complex as anything from the microenvironment in which the client operates to more expansive arenas or further, from the perspective of success of the client undertaking is calculated in dynamic systems extraction and inference module 214, which use, among other tools algorithms based upon Shannon entropy, Hartley entropy and mutual information dependence theory.

Of great importance in any decision or new project is the amount of value that is being placed at risk by choosing one decision over another. Often this value is monetary but it can also be competitive placement, operational efficiency or relationship based, for example: the may be the effects of keeping an older, possibly somewhat malfunctioning customer relationship management system one more quarter instead of replacing it for $14 million dollars and a subscription fee. The automated planning service module has the ability predict the outcome of such decisions per value that will be placed at risk using programming based upon the Monte Carlo heuristic model 216 which allows a single "state" estimation of value at risk. It is very difficult to anticipate the amount of computing power that will be needed to complete one or more of these decision analyses which can vary greatly in individual needs and often are run with several alternatives concurrently. The invention is therefore designed to run on expandable clusters 215, in a distributed, modular, and extensible approach, such as, but not exclusively, offerings of Amazon's AWS. Similarly, these analysis jobs may run for many hours to completion and many clients may be anticipating long waits for simple "what if" options which will not affect their operations in the near term while other clients may have come upon a pressing decision situation where they need alternatives as soon as possible. This is accommodated by the presence of a job queue that allows analysis jobs to be implemented at one of multiple priority levels from low to urgent. In case of a change in more hypothetical analysis jobs to more pressing, job priorities can also be changed during run without loss of progress using the priority-based job queue 218.

Structured plan analysis result data may be stored in either a general purpose automated planning engine executing Action Notation Modeling Language (ANML) scripts for modeling which can be used to prioritize both human and machine-oriented tasks to maximize reward functions over finite time horizons 217 or through the graph-based data store 145, depending on the specifics of the analysis in complexity and time run.

Figure 3:
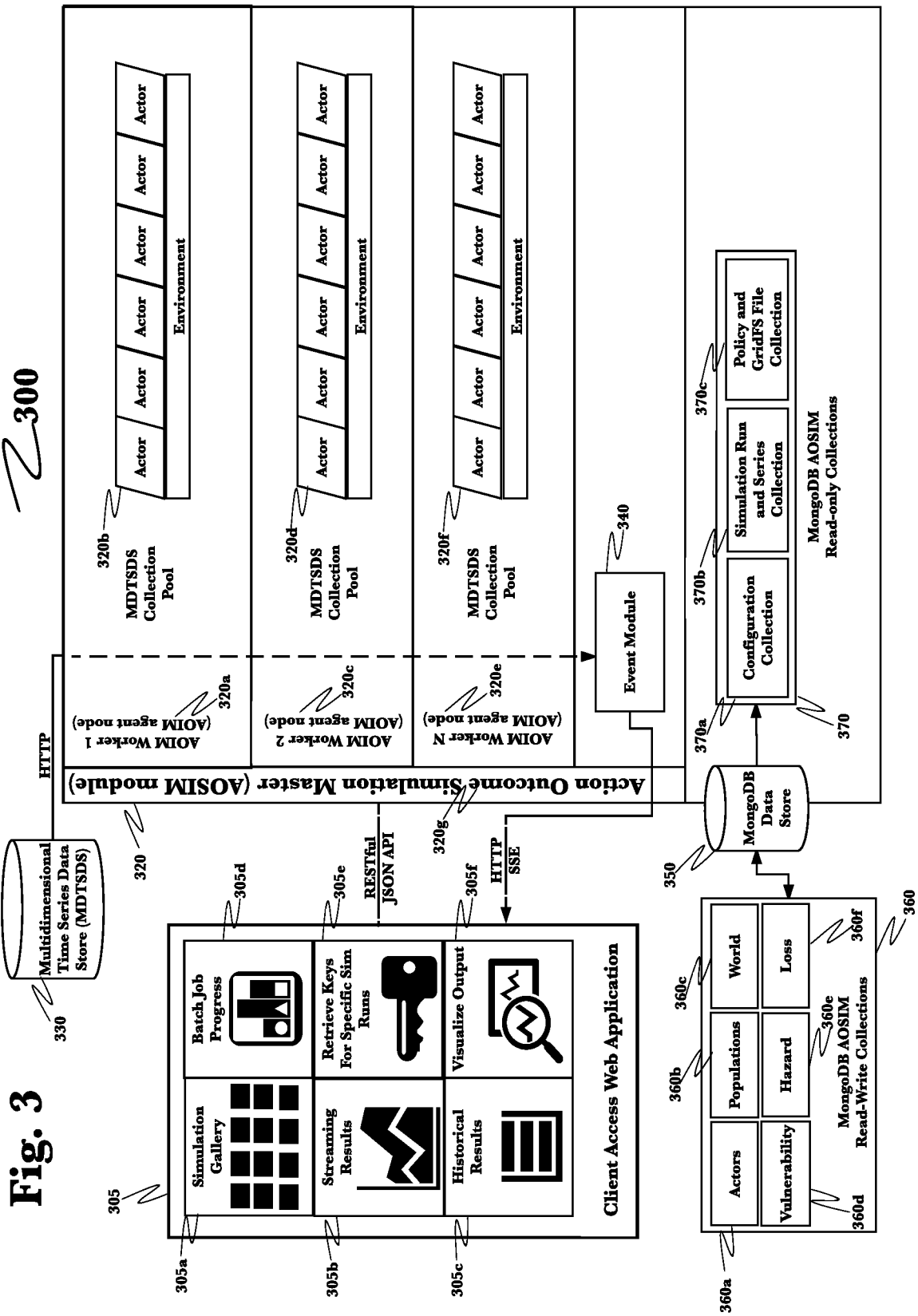
FIG. 3 is a diagram of an exemplary architecture of an action outcome simulation module and related modules according to an embodiment of the invention.

The results of analyses may be sent to one of two client facing presentation modules, the action outcome simulation module 125 or the more visual simulation capable observation and state estimation module 140 depending on the needs and intended usage of the data by the client FIG. 3 is a diagram of an exemplary architecture of an action outcome simulation module and related modules according to an embodiment of the invention 300. Set up and control for each simulation is specified through the client access web application 105 control screens programmed into the decision operating system 305. These screens may include such options of choosing a simulation framework from a set of predefined simulation types 305a and eventually starting a novel simulation; inspecting progress of the multiple batch jobs that may represent the activities of actors, represent specific events and control the base environment, among other tasks of a simulation known to those skilled in the art 305d; streaming intermediary result data that is being collected during simulation progress 305b, obtaining the digital encryption keys for one or more simulation runs such that programmatic changes may be made to one or more static assumption parameters or to an algorithm that handles incoming model data among other examples known to those skilled in the art to improve the fidelity or usefulness of an upcoming planned run 305e; peruse and review results obtained and stored from past simulation runs 305c on a plurality of prospective plans including, if included in the set up such parameters as: risk prediction, capital losses incurred, capital benefits obtained, closeness of end result to planning stage expectations, most influential variables in outcome, and assumptions used among a large plurality of other possibilities. The interface also allows comparison of result parameters from multiple related simulated experiments where starting values and assumptions of interest were changed to predict the influence of each 305c. The ability to run multiple related simulations in greatly shorter time than reality testing, which is an advantage of simulation in general and the ability to set up the simulation using, in large part graphical interface means and then have other modules of the integrated system largely handle pulling in great amounts of current, highly relevant data and transformed supporting results for each simulation run is a significant advantage of the invention. Last, the client access web application 105, 205, 305 offers a plurality of formats for presentation of the data 305f which may range from graphic-video or graphic-pictorial, to purely mathematical-numerical, as desired and appropriate to the simulation and intended use of the data at a given time point.

Simulations are carried out by the action outcome simulation module (AOSIM) 320, which includes a highly extensible, distributed structure illustrated in the embodiment by the AOSIM agent nodes: AOSIM worker 1 320a, AOSIM worker 2 320c, to AOSIM worker N 320e, the number of node expected to vary with the scale and complexity of the simulation being run, all under the programmatic control of the action outcome simulation master node which controls the introduction of data into the individual model actor substructures 320b, 320d, 320f and the timing of each simulations step run which may be changed to suit the level of inter-reliance of model actors within the simulation and the required accuracy level of the simulation versus time to run 600, 700, 800, 900 which may range from the requirement that intermediate data be transformed, possibly using the automated planning service module 130, 200. Processed data may then be entered manually back into the sequence 600, to a timing scenario where each actor steps through the simulation independently of all other actors, disregarding any possible inter-actor data dependency effects 900. Within each grouping of models or actors 320b, 320d, 320f, which due to the distributive capabilities of the AOSIM module may operate as a single group, adjacent actors may model different participants in the real world system being simulated. So, as a simple, non-exclusive example, if simulating a city street corner, the first actor in group 320b may model a distracted pedestrian in a hurry to get to work while the second actor may model a moving car making a left hand turn and the third actor a basketball approaching the same intersection. Other actors may model such conditions fog or potholes that more passively act upon the other actors to some varying extent. Beneath this entire actor structure is the environment level which monitors the working of each actor, collects and may transfer results to the master 320g for transformation and storage. The environment layer may also pass control directives to one or more of the actors at a given instance, one of which may be timing commands. Factors that may significantly affect the outcome reliability of a simulation such as but not limited to inherent variability within collected data, measurement inaccuracies, exogenous factors not envisioned in simulation setup, and discrepancies between computational parameter data and data from real world simulation analogs are ameliorated through the use of large sample sets of pertinent real world measurements collected from multiple available sources and stored by the system embodiment 330 for subsequent simulation guidance use, use of inferential information theory based statistics, and the use of heuristic modeling as described previously, among other techniques known to those skilled in the art to reduce uncertainty in such settings.

Base configuration data 370a simulation run and series parameters 370b and policy as well as MongoDB GridFS encoded support document files for use in simulation setup and initiation 370c all of which are crucial to the general function of AOSIM are stored in a read-only MongoDB store 370 and can be changed only by AOSIM APIs directly through the MongoDB data store 350 to protect their integrity but are used read-only by the client access web application to retrieve parameters during initial simulation set-up and initialization. During run of the simulation, the potentially vast amount of intermediate information generated are also stored in a MongoDB data store 350 collection 360 where the data is sorted by the system into actor related 360a, populations of actor related 360b, world 360c, projected vulnerability of simulation steps to negative effects on the overall outcome 360d, projected hazards 360e determined during simulation run and any actual projected loss incurred by the simulated pathway 360f All of these data, in their finished state are included as part of the simulation result presentation 305f.

FIG. 10 is a block diagram of an exemplary system architecture of a modeling and simulation platform 1000 according to an embodiment of the invention. Modeling a simulation platform 1000 may be horizontally scalable via a REST API and vertically scalable via a distributed computing methodology. Modeling and simulation platform 1000 may also be implemented differently depending on how web applications 1001 and APIs (Application Programming Interfaces) are provided and deployed. The components of FIG. 10 may be considered abstracted from components of FIG. 1 (e.g., observation and estimation service 140 and directed computational graph module 155 enable a visualization engine 1008, a high volume web crawler module 115 and a general transformer service module 160 enable a model engine 1006, and an action outcome simulation module 125 enables a simulation engine 1007, etc.) but are not intended to be limited to such components and may be changed out for other components known in the art.

Modeling a simulation platform 1000 according to one aspect, allows Web clients 1009 to use the system 1000 remotely and thus includes typical components needed for such a system: a webserver 1002, a load-balancer 1003, an API gateway 1004, and a content cache 1005. In some embodiments, third party software may be used to handle all said tasks such as NGINX™ or other like applications. Further embodiments use bespoke or purpose-written applications by the implementors of the system 1000 and may only be accessible from LANs or intranets. Other combinations or embodiments may be appreciated by persons with ordinary skill in the art of computer networking and computer system implementations.

One component of a preferred embodiment may comprise a model engine 1006, wherein the model engine adds or removes JSON specification files (FSM, Enhanced Behavior Tree (EBT), etc.), source code files in a model, and provides build-in Enhanced Behavior Tree actions. A model engine 1006 may provide code generation and implements hand-coded files if required. A model engine 1006 may further perform model entity specification where this is the JSON specification for an Entity (class actor, properties, parameters, etc.). Entity actions and reactions may be defined by its behavior, an Enhanced Behavior Tree. A model Enhanced Behavior Tree specification may be a JSON specification for an entity behavior (actions and reactions). An EBT specification follow a Timed Behavior Tree and supports Timed Finite State Machine (TFSM). This may allow support for pluggable objects through channels support for deadlock free model checking (WIP), JSON schema-based specification, and Timed Behavior Tree node components of node types: Composite: Sequence, Selector and State Simple: Action, Condition (with clock guards) and Input/output Events. Additional aspects include EBT actions that support Erlang coding and the use of various simulation engines such as Sim-Diasca and others, as well as being decoupled from a Model Specification.

Model engine 1006 may also use Domain Specific Language (DSL) which functions as a high-level language for EBT actions components and may allow for an end to end from the model without or with less coding in the backend. Regarding the code generation, a model engine 1006 may transform a Model Engine Specification at runtime into executable source code. Functions declared in an EBT Action may be coded apart according to one embodiment. Code in the form of AST (Abstract Syntax Tree) is injected into the Actor Erlang module. The visible source contains only the user implemented functions, not the generated code, according to one aspect. According to another aspect, built-in actions such as log, trace and probe are provided for code generation utility.

According to another aspect, model engine 1006 may comprise a model editor GUI (Graphical User Interface) and a model compiler library that handles the compilation of a model, the checking of the model, and the output files. Models generated by a model engine 1006 may be comprised of subcomponents whereby subcomponents may describe an entity or entity behavior and possess a set of variable parameters. Subcomponents may be altered, swapped out for other subcomponents, or discarded altogether to form various combinations of models for use in simulations. Use of model subcomponents allows for expeditious processing of simulations as only the subcomponents need to be recompiled and not a full simulation. This version of parametric analysis lends itself to near real-time iterative simulation processing for timely decision making.

Simulation engine 1007 typically creates simulation policies, handles initialization, creates a dashboard(s), and lastly may create experiment group(s) and experiments. It may perform the CRUD (Create, Read (also retrieve), Update, Delete) operations for API initialization and policy for the simulated world and executes and terminates simulation runs. Furthermore, post-processing of simulation results may be persisted in various databases of the implementors choosing which may be MongoDB or a Multi-Dimensional Time-Series Database (MDTSDB) according to one embodiment.

Simulation engine 1007 may initialize a simulation world which is a JSON schema defining a model with entities, behaviors, and related schema objects. A simulation policy may comprise a JSON schema for a policy. A policy may be associated to an account and may be required to define a simulation for execution and further sets the initialize file to use, simulation times, and other parameters. A policy defines how the simulation instance for a model should run, it may be implemented as a step in a pipeline workflow integrating a simulation execution according to a preferred embodiment.

According to one embodiment, simulation engine 1007 may use models of discrete event-based systems and models of continuous event-based systems. Simulation models reproduce behavioral traits of the discrete and continuous system elements. Each instance of a model is called an actor or agent. Each simulation instance involves actors who interact within an environmental scenario which is implemented as a simulation case. Environmental scenarios are managed via cells capable of representing physical or spatial state. Technical components enable the underlying simulator to operate on the models to provide useful evaluations of behavior or performance in the context of simulation cases.

According to one embodiment, simulation engine 1007 may use REST API with CORS (Cross Origin Resource Sharing—which is an HTTP-header based mechanism that allows a server to indicate any other origins (domain, protocol, or port) than its own from which a browser should permit loading of resources) support whereby these APIs expose the simulation instantiation and running functionality, such that the APIs set policies and execute a simulation using a model. Python language may be used to support actors according to one aspect; however, some consideration must be taken if the simulation environment is in Erlang because Python code runs in a different OS (Operating System) process. Logging, testing, and error codes may be implemented via APIs, macros, and configuration files according to one embodiment.

Simulation engine 1007 in combination with a model engine 1006 may use a blended modeling approach by integrating both analytical methods and system model extraction for simulations. Past observations from one or more analytical methods (e.g., regression testing, neural networks, Bayesian learning, support vector machines, etc.) coupled with retrospective outcome data (which may abide by the rule that the outcome is valid only if past conditions match future conditions) allow the system to extract models and their subcomponents. Model engine 1006 may further explore alternative models via web-scraping, natural language processing, neural networks, and other informative or rules-based computing methods. According to one embodiment, model engine 1006 may establish the various models and subcomponents by using an Advanced Cyber-Decision Platform (ACDP). The numerous system models extracted provide simulation engine 1007 with the means to iteratively learn about casual relationships thus leading to a set of probable future outcomes. Additionally, simulation engine 1007 recommends continuously competing combinations of approaches and informs/assists users in decision making.

In an aspect of the invention, globe server 1008 or a visualization engine, may be used to render and display simulation results. Features may include CRUD operations for various components of preferred embodiments such as MultiTS, DyGraph, and other visualization APIs (heatmaps, cartography layers, time-series data, etc.). According to one embodiment, a user defined dashboard (specification in JSON schema) the globe dashboard component renders widgets mapped to data providers. Specifically, the globe server 1008 utilizes software, custom code, and API's that provide 3D tiling, real-time geospatial analysis, and bespoke layered visualizations to the simulation results.

In some embodiments, system 1000 comprises modeling and simulating of autonomous systems, city utilities such as waste management and power grids, failure modeling for equipment engineering, various markets, and weather predictions as a few examples. These scenarios make use of the processes of modeling and simulation platform 1000, for example: determining limited properties of the target system functional or technical a priori, comparing capabilities, costs, performance, etc. of competing solutions to various system components or processes, improving technical validation of delivered software and hardware projects, developing and tuning complex systems across an enterprise in a manner which remains cognizant of effects on interconnected systems, quantifying costs with increased granularity and value them probabilistically according to risks and cash flow, enabling platform and model evolution by enabling a priori evaluation of changes to functional or technical parameters, identifying and testing behavioral anomalies resulting from malicious actors, equipment or software malfunctions, or exogenous shocks to the system.

Considering a specific scenario, a client 1009 may interact with the system 1000 via a web application 1001 whereby the client inputs system model parameters and conditions using a model engine 1006. Model engine 1006 may further automatically determine additional system inputs and additional environmental conditions of the model for a simulation. Subsequently, a model engine 1006 may then retrieve relevant data for model inputs and conditions and begin to identify entities, entity actions, and behaviors. This may be a new waste management schedule and route plan whereby the model engine considers weather history and patterns, optimal route planning, employee schedules, time, and production of employees also with regard to time needed to perform actions. Model engine 1006 may create a schema of the model and generate simulation code for the simulation engine 1007. Simulation engine 1007 may iteratively run many simulations to recommend the optimal future outcome based on the client's parameters input at the outset. Should the client have specified financial bounds, temporal bounds, or other limiting factors, those factors will drive the optimal results algorithms. Such an example may entail a potential shift in employee retention and changing weather patterns due to climate change that disrupt current models where now the waste management facility must adapt to the dynamic environment. Lastly, the simulation results may be rendered and displayed to the client via a globe server 1008 (visualization engine 1008). The visualization may take many forms depending on the visualization engine 1008 employed by the embodiment. Visualizations may entail cyber-physical graphs or other node graphs, bar charts and graphs, real-time or near real-time satellite imagery or other map data forms and which may include overlays such as heat maps, routes, and other distinct features.

Consider further examples of complex business systems such as offshore oil rigs, oil pipelines, modern energy (including nuclear and fossil fuel), and telecommunication infrastructures. These are some examples that benefit from a modeling and simulation platform 1000 that uses blended modeling. In the case of these complex business systems and many more, the complex systems rely on a sophisticated network of sensors. Sensors located in the far reaches of an oil pipeline or telecommunication network, or deep within radioactive water, or remote sensors in an oil rig pose significant risks and costs should a sensor go offline, report inaccurate measurements, or experiences a series of faults. Businesses must then decide whether to send personnel to investigate, send technicians to replace the sensor, or in some cases, consider that the sensor is reporting accurately and what implications that may have.

One example may be a pressure sensor reporting a loss in pressure at a remote location of an oil pipeline. Should the operators send a clear signal (potentially cleaning a faulty sensor in the case there is no actual loss in pressure) to the sensor or send an immediate close signal upstream to stop any further leakage at the cost of stopping supply and a loss in profits. A near real-time modeling and simulation platform 1000 may generate models regarding the situation and probable cause and effects to produce outcome-based results for businesses to use for timely decision-making. Establishing various scenario causes and effects may be accomplished through web-scraping and natural language processing, a prepopulated rules database, an ADCP, or other informative-computing processes known in the art. For example, a model where a clear signal is sent and a model where a close signal is sent are generated and run in parallel simulations whereby costs and risks are calculated for each outcome as part of the various decision pathways presented to the user.

Another example may be a corporate satellite office experiencing an acute surge in virus alerts. The virus alerts may be due to actual viruses, corporate espionage, or the installation of a new software that throws a false positive. The repercussions of each scenario posing their own levels of risk and cost. The satellite office may have no Information Technology support personnel located nearby and thus must make immediate cybersecurity decisions based on limited factors remotely. A modeling engine 1006 may ingest a plurality of cybersecurity data, log data, metadata, alongside performing network requests for information from devices and other metrics to inform various models for simulation. A simulation engine 1007 may then perform a series of simulations for each scenario and produce multiple decision pathways with risk and costs information. These decision pathways help cybersecurity personnel make timely and informed decisions about the task at hand.

Figure 4:
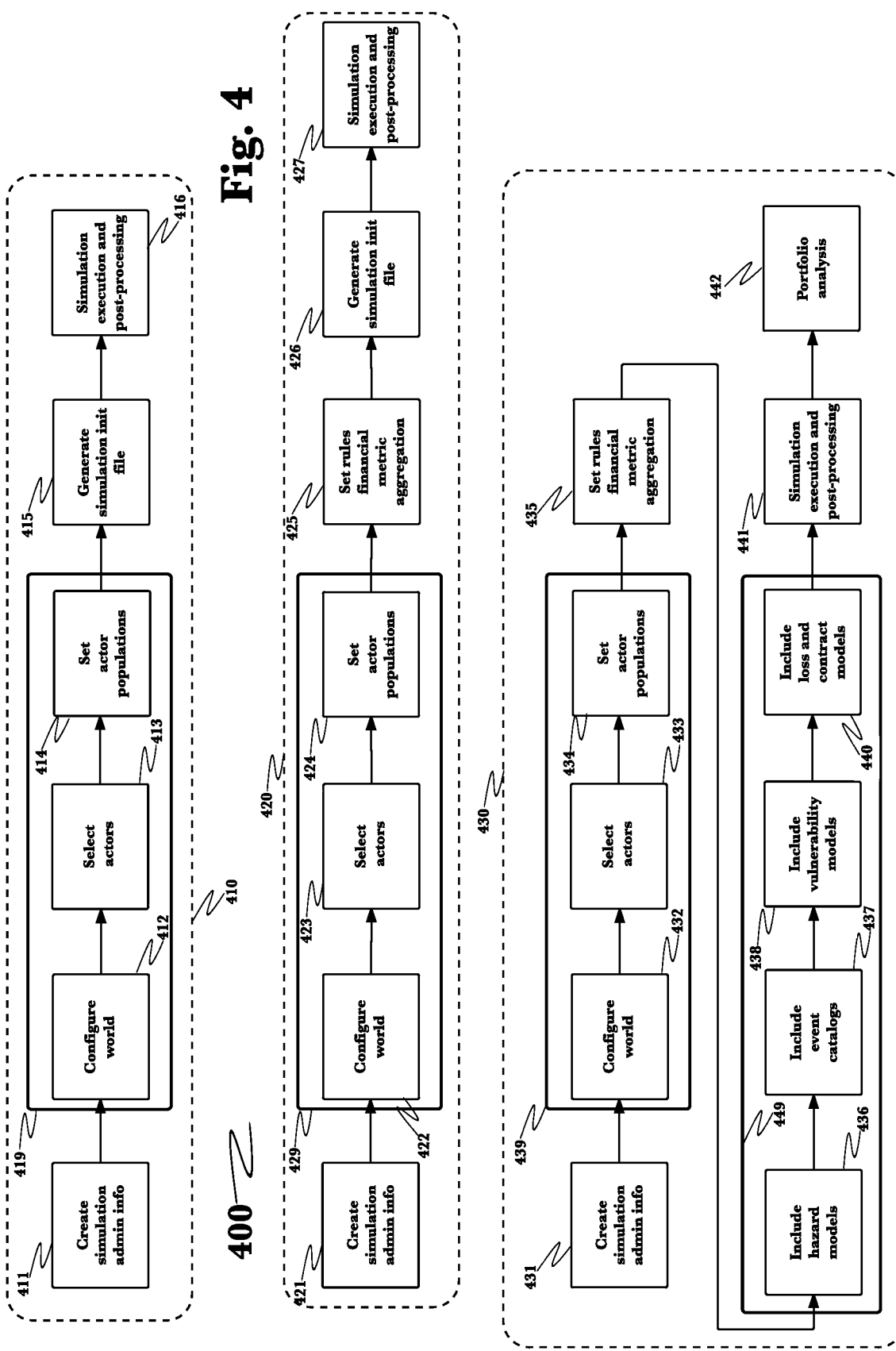
FIG. 4 is flow diagram illustrations of setup and execution of three types of action outcome simulation module simulation runs according to an embodiment of the invention.

In some embodiments, cost and risk thresholds may be programmed and stored such that decisions like the ones previously described are automatically performed without the need for human intervention. Other embodiments may automatically perform one of the decision pathways with preapproval from a user or post-moderation also from a user.
Detailed Description of Exemplary Aspects FIG. 4 is flow diagram illustrations of setup and execution of three types of action outcome simulation module simulation runs according to an embodiment of the invention 400. The top panel 410, depicts the simple simulation which may be used to explore the myriad of "what if" ideas that may arise during the operation where there is little or no foreseen capital and market risk involved.

As may be expected, the set up phase of the simulation consumes the large majority of the steps as once simulation execution is initiated, the author must then only wait for and then interpret, possibly further manipulate the results 416. The process starts with the creation of administrative information 411, here such parameters as boundaries of data values to be used, the data store database origin or origins of data to be used, if more than one source exists, decision operating system resource levels to be used, timing scheme to be used, progress indicators to be displayed and desired mode of display of the completed simulation may be just a few examples of a much larger set of administrative parameters known to those skilled in the art which may be specified. For any simulation, a reliably useful end result integrally depends on the proper configuration of the factors that will affect the actors of the simulation, forming the milieu in which they will perform their programmed actions, here designated the "world" 412. That the constraints and influences exercised by the configured factors of the world match those of the real-world under expected conditions of the simulation must be certain. Of equal importance is the proper configuration of the actors 413 modeling the real-world items within the simulation, again, reliable data concerning the behavior of each actor type and variants within actor types must closely match those of the real-world items under programmed simulation conditions. It is also important to carefully consider the selection of actor types and numbers of each type to be included in a simulation as this factor may change the outcome considerably and lead to conclusions contrary to reality if real-world proportions are far afield of those in the computer simulation. It is sometimes useful to place individual instances of a particular model (actor) type into one or more groups to measure not only how each individual behaves in the simulation but the overall results obtained from the group. The embodiment allows this by supporting actor populations to be specified 414. Successful completion of a real-world reliable simulation may be greatly augmented by the ability to compare the results of a partial simulation run with as much of the limited real-world data as is available or possibly even incorporating portions of that real-world data into the constituent parts of the simulation such as the world configuration 412, selection of actor model characteristics 413 and types and the generation of appropriate actor populations 414. The decision operating system offers a mechanism for use of this potential advantage by allowing the simulation constituents listed to be attached as run parameters to the automated planning service module, bringing the inferential statistic and Monte Carlo heuristic algorithms into support in directing the intelligent inclusion and use of data from other modules of the decision operating system for improvement of the course taken by the simulation when run to completion 419. At the end of the multiple, highly important configuration steps, simulation initialization file containing all of the parameters, module tie-in references and administrative run directives may be created 415. This defines the simulation to be run in format readable by the action outcome simulation module. The simulation is then run, any post processing completed, and the results displayed, possibly motion graphically through use of the observation state estimation service 140 with its game engine 140a and presentation manipulation scripting capabilities 140b, or possibly presented in some other format per the pre-design of authors of the simulation.

The middle panel 420, depicts a simulation with financial aggregation which may be used to explore decisions or projects where the loss or gain of capital is possible. Capital, as an actor behaves the same, so creating multiple instantiations of it in a simulation is a waste of time and potentially computing resources. Capital is therefore treated as an aggregate much as the actors in a system dynamics-based simulation where all actors are aggregate agents of their real-world counterpart. As may be expected, the set up phase of the simulation consumes the large majority of the steps as once simulation execution is initiated, the author must then only wait for and then interpret, possibly further manipulate the results 427. The process starts with the creation of administrative information 421, here such parameters as boundaries of data values to be used, the data store database origin or origins of data to be used, if more than one source exists, decision operating system resource levels to be used, timing scheme to be used, progress indicators to be displayed and desired mode of display of the completed simulation may be just a few examples of a much larger set of administrative parameters known to those skilled in the art which may be specified. For any simulation, a reliably useful end result integrally depends on the proper configuration of the factors that will affect the actors of the simulation, forming the milieu in which they will perform their programmed actions, here designated the "world" 422. That the constraints and influences exercised by the configured factors of the world match those of the real-world under expected conditions of the simulation must be certain. Of equal importance is the proper configuration of the actors 423 modeling the real world items within the simulation, again, reliable data concerning the behavior of each actor type and variants within actor types must closely match those of the real-world items under programmed simulation conditions. It is also important to carefully consider the selection of actor types and numbers of each type to be included in a simulation as this factor may change the outcome considerably and lead to conclusions contrary to reality if real-world proportions are far afield of those in the computer simulation. It is sometimes useful to place individual instances of a particular model (actor) type into one or more groups to measure not only how each individual behaves in the simulation but the overall results obtained from the group. The embodiment allows this by supporting actor populations to be specified 424. Successful completion of a real-world reliable simulation may be greatly augmented by the ability to compare the results of a partial simulation run with as much of the limited real-world data as is available or possibly even incorporating portions of that real-world data into the constituent parts of the simulation such as the world configuration 422, selection of actor model characteristics 423 and types and the generation of appropriate actor populations 424. The decision operating system offers a mechanism for use of this potential advantage by allowing the simulation constituents listed to be attached as run parameters to the automated planning service module, bringing the inferential statistic and Monte Carlo heuristic algorithms into support in directing the intelligent inclusion and use of data from other modules of the decision operating system for improvement of the course taken by the simulation when run to completion 429. Unlike the simple simulation described directly above 410, the rules and boundaries for the handling and reporting of capital flow within the simulation must be specified before the simulation is run 425. This may include items such as but not limited to total capital budget, how much capital loss can be tolerated in a single or specified number of simulation steps, whether profit should be placed higher than other considerations in some or all sets of the simulation, whether capital can be traded for brand recognition or confidence and many more potential choices that may be known to one skilled in the field. At the end of the multiple, highly important configuration steps, simulation initialization file containing all of the parameters, module tie-in references and administrative run directives may be created 426. This defines the simulation to be run in format readable by the action outcome simulation module. The simulation is then run, any post processing completed, and the results displayed, possibly motion graphically through use of the observation state estimation service 140 with its game engine 140a and presentation manipulation scripting capabilities 140b, or possibly presented in some other format per the pre-design of authors of the simulation.

The middle panel 430, depicts a simulation for insurance or risk analysis which may be used to explore decisions or projects where the large scale loss of capital is possible due to wholesale loss of market share, loss of infrastructure or capital equipment investment or loss existing infrastructure or capital equipment is possible among other scenarios known to those skilled in the field. Insurance simulation may take the form of simulating the events that might lead to an expensive liability payout or equipment payout such as the failure of large oil pipeline in a secluded area with subsequent release of a significant number of gallons of crude oil, necessitating a massive cleanup and possible environmentally based restitution, or many other possible examples imaginable by one skilled in the field. Capital, as an actor behaves the same, so creating multiple instantiations of it in a simulation is a waste of time and potentially computing resources. Capital is therefore treated as an aggregate much as the actors in a system dynamics-based simulation where all actors are aggregate agents of their real-world counterpart. As may be expected, the set up phase of the simulation consumes the large majority of the steps as once simulation execution is initiated, the author must then only wait for and then interpret, possibly further manipulate the results 441. The process starts with the creation of administrative information 431, here such parameters as boundaries of data values to be used, the data store database origin or origins of data to be used, if more than one source exists, decision operating system resource levels to be used, timing scheme to be used, progress indicators to be displayed and desired mode of display of the completed simulation may be just a few examples of a much larger set of administrative parameters known to those skilled in the art which may be specified. For any simulation, a reliably useful end result integrally depends on the proper configuration of the factors that will affect the actors of the simulation, forming the milieu in which they will perform their programmed actions, here designated the "world" 432. That the constraints and influences exercised by the configured factors of the world match those of the real-world under expected conditions of the simulation must be certain. Of equal importance is the proper configuration of the actors 433 modeling the real world items within the simulation, again, reliable data concerning the behavior of each actor type and variants within actor types must closely match those of the real-world items under programmed simulation conditions. It is also important to carefully consider the selection of actor types and numbers of each type to be included in a simulation as this factor may change the outcome considerably and lead to conclusions contrary to reality if real-world proportions are far afield of those in the computer simulation. It is sometimes useful to place individual instances of a particular model (actor) type into one or more groups to measure not only how each individual behaves in the simulation but the overall results obtained from the group. The embodiment allows this by supporting actor populations to be specified 434. Successful completion of a real-world reliable simulation may be greatly augmented by the ability to compare the results of a partial simulation run with as much of the limited real-world data as is available or possibly even incorporating portions of that real-world data into the constituent parts of the simulation such as the world configuration 432, selection of actor model characteristics 433 and types and the generation of appropriate actor populations 434. The decision operating system offers a mechanism for use of this potential advantage by allowing the simulation constituents listed to be attached as run parameters to the automated planning service module 439, bringing the inferential statistic and Monte Carlo heuristic algorithms into support in directing the intelligent inclusion and use of data from other modules of the decision operating system for improvement of the course taken by the simulation when run to completion 439. Unlike the simple simulation described directly above 410, the rules and boundaries for the handling and reporting of capital flow within the simulation must be specified before the simulation is run 435. This may include items such as but not limited to total capital budget, how much capital loss can be tolerated in a single or specified number of simulation steps, whether profit should be placed higher than other considerations in some or all sets of the simulation, whether capital can be traded for brand recognition or confidence and many more potential choices that may be known to one skilled in the field. Accurate, reliable simulation of the element of risk is extremely complex and requires the inclusion of several additional actors within a risk inclusive simulation such as, but not necessarily limited to models for hazard present under the conditions of the simulation 436, one or more catalogs of events that may lead to or add to both the initiation of a cataclysmic condition or its aftermath 437, models of known vulnerabilities of all actors within the simulation 438 and finally, models that specify liability possibilities the insurance coverage or finance contracts pertinent to the actors present in the simulation 440 to be run along with the potential loss figures for chains of events possible to transpire under the contractual obligations currently in force 440. Due to the extreme complexity of each of these simulation areas, hazard 436, event occurrence 437, vulnerability of actors 438, and contract and loss potential models 440, the system also make use of the significant processing and predictive power of the automated planning service module 130 available to assist in initialization of and progression of the simulation including these models 449. At the end of the multiple, highly important configuration steps, simulation initialization file containing all of the parameters, module tie-in references and administrative run directives may be created 426. This defines the simulation to be run in format readable by the action outcome simulation module. The simulation is then run, any post processing completed, and the results displayed, possibly motion graphically through use of the observation state estimation service 140 with its game engine 140*a* and presentation manipulation scripting capabilities 140*b,* or possibly presented in some other format per the pre-design of authors of the simulation. Due to the potential of multiple accidents which may result in the payment of very large sums of capital, this particular type of simulation may end with the system analyzing the policy portfolio of an underwriter to confirm that reserve capital is sufficient to cover a reasonable proportion of losses and premiums for individual corporations are in line with potential risk and resultant payout. 442

FIG. 5. is a diagram depicting the primary processing locations of individual components of an action outcome simulation module. As has been implied and might be expected given the complexities of simulation of various decision and project progression and outcomes, multiple modules within the decision software operating system that makes up the invention may be involved with processing. As would be expected all simulation policy 501 is present within and the actual execution of simulations 502 take place within the action outcome simulation module 540. The actor or model component 505, which holds the modeled representation of the real-world items that take part in simulation is associated primarily with the action outcome simulation module where it runs, but the rules 505*a* that make up its actions and influence boundaries may be either modified before or after simulation run within the automated planning service module, 130, 550 as previously indicated 400 and possibly the decomposable transformer service module 150 the functions of which have been described previously. Similar, but not identical, to the actor component, the world component, the parameters that influence the actions of all actors during simulation are found and executed in the action outcome simulation module, but in this case, both the individual world entity 510 and its policy rules of action and influence during execution may be processed both before simulation run and after run commencement in. The previously mentioned actor population component 515, while potentially important part of a plurality of simulations is in reality an aggregator rather than interacting directly with other components during simulation both it as a component of the simulation engine and the policy rules that make it up which has a framework derived from the world policy subcomponent 515a are entirely constructed and stored within the automated planning service module 130 and the decomposable transformer service module 150, 550 where weighting of the influence of certain individual actors and the total strength of population influence on the simulation may be coordinated to produce the most reliable, realistic end result of a simulation run. The last three components listed, hazard model 520, vulnerability model 525 and financial model 525 are all library like components included in specific simulations to enable the modeling of specific additional facets of a simulation not part of more simplistic simulation executions. It is extremely important, due to the gravity of the results of their effects on those facets which are of great importance to the simulation author who included them that these components 520, 525, 530 and the policy rules governing how they interact within simulation 520a, 525a, 530a, be as up-to-date with current real-world conditions and data in those areas as is possible and, indeed, much of the data which these three components supply are subject to continuous measurable update by sensors or web available data. It is therefore expected that their construction and upkeep be handled entirely by the modules of the decision operating system tasked with the high speed accumulation and meaningful processing of externally available data followed by intelligent integration of the new data with relevant historical data already present, the multidimensional time series data store 120, previously described, directed computational graph 155, decomposable transformer service module 150, 545, and the automated planning service module 550 may all be responsible for the creation and upkeep of accurate useful hazard model 520, vulnerability model 525 and financial model 530 components.

It must be stated that the disclosed associations between specific simulation components and specific functions of the invention (modules of the embodiment) are illustrative and were described as the inventors believe such associations highly likely and productive during execution of simulation functions of the invention. Stating such example associations should not be taken to mean that other associations both during simulation execution and other processes are not possible or not made. They are possible and they are made, in the interests of brevity and comprehension associations of lesser impact were omitted from description. The invention is designed to allow the computing cooperation between any one function with any other function in the pursuit of the most accurate, timely predictive result possible at all times and all that may be needed in some few cases is some additional programming to promote unforeseen new functional association.

FIG. 6 is a flow chart diagram illustrating centralized event queue timing according to an embodiment of the invention 600. There are instances where the system being simulated is extremely complex or where even with the abilities of the AOSIM 300 to perform automated processing of data from categories such as but not limited to: physical world, cyber-physical interactions, socio-technical, information network interactions, persona integration and cognitive reasoning, at least some of the intermediate result data must be inspected and may be manipulated, possibly by another module of the decision operating system 100, perhaps such as the automated planning service module 130, the directed computational graph module 155 or in at least one case, manually for a particular simulation step, before re-introduction into the simulation 616. Other times the sequence of when each actor 601, 602, 603, 604, 605, 606, 607 runs a next step 608, 609, 610, 611, 612, 613, 614 in the simulation may need to be modified based on the previous step 616. Under such conditions, it is important that all data manipulation and sequence processing are completed 615 prior to the next step being initiated 617.

FIG. 7 is a flow chart diagram illustrating time stepped queue timing according to an embodiment of the invention 700. There are instances where the system being simulated includes actors that are highly interdependent and almost certainly rely on the outcome of one or more other actors at multiple steps to result in reliable simulation results. Under these conditions, it is critical that all actors 701, 702, 703, 704, 705, 706, 708 complete each step 709, 710, 711, 712, 713, 714, 715 (x) 716 before any of the actors begin the next step (x+1) 717.

FIG. 8 is a flow chart diagram illustrating conservative event-driven queue timing according to an embodiment of the invention 800. There are instances where the system being simulated includes actors that are somewhat interdependent and may rely on the outcome of one or more actors at one or more steps to result in reliable simulation results. Under these conditions, it is important that actors 801, 802, 803, 804, 805, 806 complete steps where interdependency exists 807, 808, 809, 810, 811, 812, 813, (step x) 814 before the actors begin the next step (x+1) 815 and therefore when this timing scheme is used, individual actors will only perform the next step 815 when the embodiment determines interdependency at the step in question is extremely unlikely 814.

FIG. 9 is a flow chart diagram illustrating optimistic event-driven queue timing according to an embodiment of the invention 900. There are instances where the system being simulated does not include any interdependent actors that rely on the outcome of one or more actors at one or more steps to result in reliable simulation results or where time constraints and the effects of missing update such interdependent data are such that running the simulation as quickly as possible is desired. Under these conditions, each actor 901, 902, 903, 904, 905, 906, 916 complete steps 907, 908, 909, 910, 911, 912, 913, (x) independently without regard to whether interdependency exists 914 before the actors begin the next step (x+1) 915 and therefore when this timing scheme is used, individual actors each 915 as rapidly as possible 914.

There is no reason that the invention could not employ multiple timing schemes during a single simulation as each scheme becomes appropriate. This may optimize the speed at which simulations complete while ensuring that all interdependent actor data states within the simulation are honored and the reliable completion of any simulation occurs.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more buses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in Fig. B. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for predicting complex system outcomes using a multi-model, blended analysis methodology, comprising:
  a model engine comprising at least a plurality of programming instructions stored in the memory of, and operating on at least one processor of, a computing device, wherein the plurality of programming instructions, when operating on the processor, cause the computing device to:
  receive a request for prediction of a future outcome for a complex system based on a model input;
  retrieve historical data for the complex system, wherein the historical data comprises a plurality of past events occurring within the complex system and a past outcome of the complex system as a result of the plurality of past events;
  process the historical data through a machine learning algorithm that has been trained to identify correlations between the past events and the past outcome; and
  generate a plurality of competing system models from the identified correlations, wherein:
    each competing system model is a representation of the complex system;
    each past event is represented in each competing system model by one or more individual model actors; and
    the parameters of at least one individual model actor in each competing system model differ from the parameters of all other individual model actors in all other competing system models; and
  a simulation engine comprising at least a plurality of programming instructions stored in the memory of, and operating on at least one processor of, a computing device, wherein the plurality of programming instructions, when operating on the processor, cause the computing device to:
    retrieve the plurality of competing system models from the model engine;
    simultaneously run each of the plurality of competing system models to determine a set of causal relationships between the past events and the past outcome; and
    predict a future outcome of the complex system based on the model input using the causal relationships; and
  a visualization engine comprising at least a plurality of programming instructions stored in the memory of, and operating on at least one processor of, a computing device, wherein the plurality of programming instructions, when operating on the processor, cause the computing device to:
    display a visualization of the predicted future outcome.

2. The system of claim 1, wherein the future outcome is based on a plurality of actual historical events from the past or from a plurality of hypothesized historical events.

3. The system of claim 1, wherein the historical data comprises sensor data.

4. The system of claim 1, further comprising a web-scraper.

5. The system of claim 4, wherein the web-scraper retrieves Internet data related to the plurality of past events.

6. The system of claim 5, wherein the related Internet data is past comprises the past outcome.

7. The system of claim 1, wherein the machine learning algorithm is a neural networks.

8. The system of claim 1, wherein the visualization engine renders the future outcome as one or more graphs.

9. A method for predicting complex system outcomes using a multi-model, blended analysis methodology, comprising the steps of:
  using a model engine operating on a computing device comprising a memory and a processor:
    receiving a request for prediction of a future outcome for a complex system based on a model input;
    retrieving historical data for the complex system, wherein the historical data comprises a plurality of past events occurring within the complex system and a past outcome of the complex system as a result of the plurality of past events;
  process the historical data through a machine learning algorithm that has been trained to identify correlations between the past events and the past outcome; and
  generating a plurality of competing system models from the identified correlations, wherein:
    each competing system model is a representation of the complex system;
    each past event is represented in each competing system model by one or more individual model actors; and
    the parameters of at least one individual model actor in each competing system model differ from the parameters of all other individual model actors in all other competing system models;
  using a simulation engine operating on the computing device:
    retrieving the plurality of competing system models from the model engine;
    performing run each of the plurality of competing system models to determine a set of causal relationships between the past events and the past outcome;
    predict a future outcome of the complex system based on the model input using the causal relationships; and
  using a visualization engine operating on the computing device:
    displaying a visualization of the predicted future outcome.

10. The method of claim 9, wherein the future outcome is based on a plurality of actual historical events from the past or from a plurality of hypothesized events.

11. The method of claim 9, wherein the historical data comprises sensor data.

12. The method of claim 9, further comprising a web-scraper.

13. The method of claim 12, wherein the web-scraper retrieves Internet data related to the plurality of events.

14. The method of claim 13, wherein the related Internet data is past observations and past outcomes.

15. The method of claim 9, wherein the machine learning algorithm is a neural networks.

16. The method of claim 9, wherein the visualization engine renders the future outcome as one or more graphs.

* * * * *